United States Patent
Baek et al.

(10) Patent No.: US 7,852,842 B2
(45) Date of Patent: Dec. 14, 2010

(54) DATA PROCESSING METHOD FOR NETWORK LAYER

(75) Inventors: Seung-Myun Baek, Changwon-shi (KR); Koon-Seok Lee, Changwon-shi (KR); Yong-Tae Kim, Gimhae-shi (KR)

(73) Assignee: LG Electronics Inc., Seoul (KR)

( * ) Notice: Subject to any disclaimer, the term of this patent is extended or adjusted under 35 U.S.C. 154(b) by 415 days.

(21) Appl. No.: 11/547,360

(22) PCT Filed: Mar. 31, 2005

(86) PCT No.: PCT/KR2005/000945

§ 371 (c)(1),
(2), (4) Date: Sep. 20, 2007

(87) PCT Pub. No.: WO2005/094191

PCT Pub. Date: Oct. 13, 2005

(65) Prior Publication Data

US 2008/0259956 A1  Oct. 23, 2008

(30) Foreign Application Priority Data

Mar. 31, 2004  (KR) ............... 10-2004-0022193
Mar. 31, 2004  (KR) ............... 10-2004-0022198
Mar. 31, 2004  (KR) ............... 10-2004-0022199
Mar. 31, 2004  (KR) ............... 10-2004-0022200

(51) Int. Cl.
   *H04L 12/28* (2006.01)
   *H04J 3/22* (2006.01)
   *H04J 3/24* (2006.01)

(52) U.S. Cl. .................. 370/392; 370/469; 370/474

(58) Field of Classification Search .............. None
See application file for complete search history.

(56) References Cited

U.S. PATENT DOCUMENTS

| 5,151,899 A | 9/1992 | Thomas et al. |
| 6,359,888 B1 | 3/2002 | Koch et al. |
| 6,519,223 B1 | 2/2003 | Wager et al. |
| 6,718,159 B1 | 4/2004 | Sato |

(Continued)

OTHER PUBLICATIONS

Koon-Seok Lee, et al., "A New Protocol for Home Appliances—LnCP," In: IEEE International Symposium on Industrial Electronics, ISIE 2001, Piscataway, NJ, USA, IEEE, Jun. 12-16, 2001, ISBN 0-7803-7090-2, pp. 286-291.

(Continued)

*Primary Examiner*—Andrew Lee
(74) *Attorney, Agent, or Firm*—McKenna Long & Aldridge LLP

(57) ABSTRACT

The present invention discloses a data processing method for network layer in a home network system (1) based on a living network control protocol. The data processing method for network layer based on a protocol, that is composed of at least a physical layer, a data link layer, a network and an application layer, includes the steps of: receiving a message sending primitive (MsgSend) in application layer protocol data unit (APDU) frp, the application layer; according to the message sending primitive (MsgSend), generating a communication cycle description; according to the message sending primitive (MsgSend) and/or the communication cycle description, generating a packet sending primitive (PktSend) in network layer protocol data unit (NPDU); and transmitting the packet sending primitive (PktSend) to the data link layer.

11 Claims, 16 Drawing Sheets

U.S. PATENT DOCUMENTS

| | | | |
|---|---|---|---|
| 2002/0196158 A1* | 12/2002 | Lee | 340/825.69 |
| 2003/0103521 A1 | 6/2003 | Raphaeli et al. | |
| 2003/0177243 A1 | 9/2003 | Collette et al. | |
| 2004/0243684 A1* | 12/2004 | Ha et al. | 709/208 |
| 2005/0135318 A1 | 6/2005 | Walton et al. | |
| 2005/0149642 A1* | 7/2005 | Choi et al. | 710/15 |
| 2005/0256944 A1* | 11/2005 | Baek et al. | 709/223 |
| 2006/0146837 A1* | 7/2006 | Atsuki et al. | 370/400 |
| 2006/0155984 A1* | 7/2006 | Tsuchida et al. | 713/156 |
| 2008/0013567 A1 | 1/2008 | Benveniste | |
| 2008/0285489 A1 | 11/2008 | Meier | |

OTHER PUBLICATIONS

Christos Douligeris et al., "Communications and Control for a Home Automation System," In: Proceedings of the Southeast Conference, Williamsburg, New York, USA, IEEE, Apr. 7, 1991, vol. 1, ISBN 0-7803-0033-5, pp. 171-175.

Koon-Seok Lee, et al., "Network Configuration Technique for Home Appliances Based on LnCP," IEEE Transaction on Consumer Electronics, vol. 49, No. 2, May 2003, pp. 367-374.

Corner, Douglas, Computernetzwerke und Internets, $2^{nd}$ Edition, Prentice Hall, 2000, ISBN 3-8273-7012-4, Chapters 7.7-7.9 and 14.10.5.

* cited by examiner

DATA PROCESSING METHOD FOR NETWORK LAYER

This application claims the benefit of Korean Patent Application No. 2004-0022200, filed on Mar. 31, 2004; Korean Patent Application No. 2004-0022199, filed Mar. 31, 2004, Korean Patent Application No. 2004-0022193, filed Mar. 31, 2004, Korean Patent Application No. 2004-0022198, filed Mar. 31, 2004 and PCT Application No. PCT/KR2005/000945, filed on Mar. 31, 2005, which are hereby incorporated by reference for all purposes as if fully set forth herein.

TECHNICAL FIELD

The present invention relates in general to a data processing method, and more particularly to, a data processing method for network layer in a home network system using a living network control protocol.

BACKGROUND ART

A home network connects various digital home appliances so that the user can always enjoy convenient, safe and economic life services inside or outside the house. Refrigerators or washing machines called white home appliances have been gradually digitalized due to the development of digital signal processing techniques, home appliance operating system techniques and high speed multimedia communication techniques have been integrated on the digital home appliances, and new information home appliances have been developed, to improve the home network.

As shown in Table 1, the home network is classified into a data network, an entertainment network and a living network by types of services.

TABLE 1

| Classification | Function | Service type |
| --- | --- | --- |
| Data network | Network between PC and peripheral devices | Data exchange, internet service, etc. |
| Entertainment network | Network between A/V devices | Music, animation service, etc. |
| Living network | Network for controlling home appliances | Home appliances control, home automation, remote meter reading, message service, etc. |

Here, the data network is built to exchange data between a PC and peripheral devices or provide an internet service, and the entertainment network is built between home appliances using audio or video information. In addition, the living network is built to simply control home appliances, such as home automation or remote meter reading.

A conventional home network system includes a master device which is an electric device for controlling an operation of the other electric devices or monitoring a status thereof, and a slave device which is an electric device having a function of responding to the request of the master device and a function of notifying a status change according to characteristics of the electric devices or other factors. Exemplary electric devices include home appliances for the living network service such as a washing machine and a refrigerator, home appliances for the data network service and the entertainment network service, and products such as a gas valve control device, an automatic door device and an electric lamp.

However, the conventional arts do not suggest a general communication standard for providing functions of controlling and monitoring electric devices in a home network system. Also, a network protocol in the conventional art home network system does not suggest an effective method for receiving and transmitting a packet.

DISCLOSURE OF THE INVENTION

The present invention is achieved to solve the above problems. An object of the present invention is to provide a data processing method using a control protocol which is a general communication standard for providing functions of controlling and monitoring electric devices in the home network system.

Another object of the present invention is to provide a data processing method using a living network control protocol as a general communication standard.

Still another object of the present invention is to provide a data processing method for network layer, featuring a high data transmission efficiency by retransmitting data in specific cases.

Still another object of the present invention is to provide a data processing method for network layer, through which a packet is transmitted from an application layer to a data link layer.

Still another object of the present invention is to provide a data processing method for network layer, through which a response packet or a notification packet is transmitted from a data link layer to an application layer in a master device.

Still another object of the present invention is to provide a data processing method for network layer, through which a request packet is transmitted from a data link layer to an application layer in a slave device.

Still another object of the present invention is to provide a data processing method for network layer for checking a duplicate packet by searching a communication cycle description corresponding to a received packet.

Still another object of the present invention is to provide a data processing method for network layer, through which a response packet is transmitted from an application layer to a data link layer in a slave device.

Yet another object of the present invention is to provide a data processing method for network layer for performing a response packet transmission by completing a communication cycle description corresponding to a previously received request packet.

In order to achieve the above-described objects of the invention, there is provided a data processing method for network layer based on a protocol composed of at least a physical layer, a data link layer, a network layer and an application layer, which the method includes the steps of receiving a message sending primitive (MsgSend) in application layer protocol data unit (APDU) from the application layer; according to the message sending primitive (MsgSend), generating a communication cycle description; according to the message sending primitive (MsgSend) and/or the communication cycle description, generating a packet sending primitive (PktSend) in network layer protocol data unit (NPDU); and transmitting the packet sending primitive (PktSend) to the data link layer.

BEST MODE FOR CARRYING OUT THE INVENTION

A data processing method for network layer of the present invention will now be described in detail with reference to the accompanying drawings.

Figure 1:
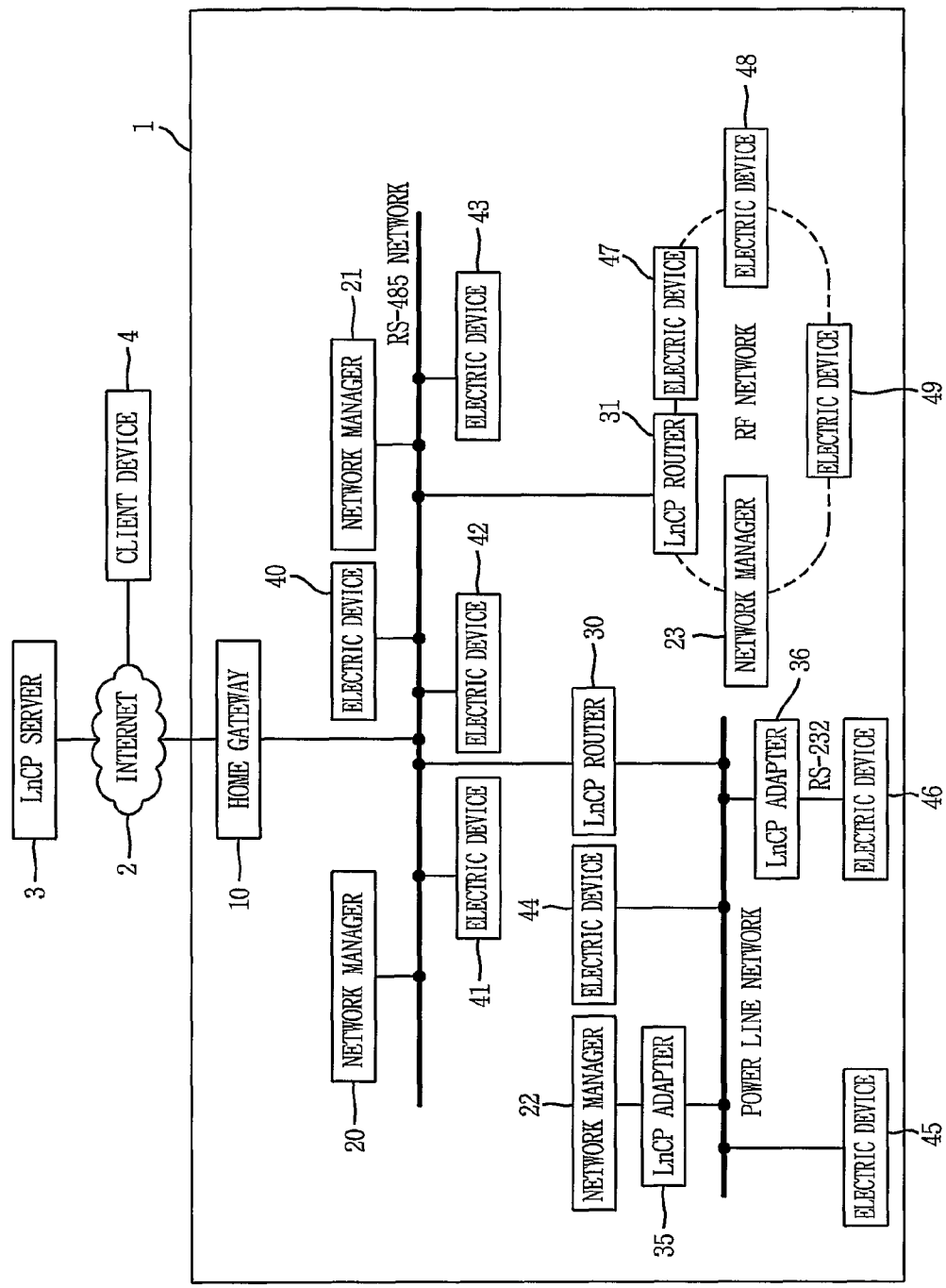
FIG. 1 is a structure view illustrating a home network system in accordance with the present invention.

FIG. 1 is a structure view illustrating the home network system in accordance with the present invention.

Referring to FIG. 1, the home network system 1 accesses an LnCP server 3 through an internet 2, and a client device 4 accesses the LnCP server 3 through the internet 2. That is, the home network system 1 is connected to communicate with the LnCP server 3 and/or the client device 4.

An external network of the home network system 1 such as the internet 2 includes additional constitutional elements according to a kind of the client device 4. For example, when the client device 4 is a computer, the internet 2 includes a Web server (not shown), and when the client device 4 is an internet phone, the internet 2 includes a Wap server (not shown).

The LnCP server 3 accesses the home network system 1 and the client device 4 according to predetermined login and logout procedures, respectively, receives monitoring and control commands from the client device 4, and transmits the commands to the network system 1 through the internet 2 in the form of predetermined types of messages. In addition, the LnCP server 3 receives a predetermined type of message from the home network system 1, and stores the message and/or transmits the message to the client device 4. The LnCP server 3 also stores or generates a message, and transmits the message to the home network system 1. That is, the home network system 1 accesses the LnCP server 3 and downloads provided contents.

The home network system 1 includes a home gateway 10 for performing an access function to the internet 2, network managers 20 to 23 for performing a function of setting an environment and managing electric devices 40 to 49, LnCP routers 30 and 31 for access between transmission media, LnCP adapters 35 and 36 for connecting the network manager 22 and the electric device 46 to the transmission medium, and the plurality of electric devices 40 to 49.

The network of the home network system 1 is formed by connecting the electric devices 40 to 49 through a shared transmission medium. A data link layer uses a non-standardized transmission medium such as RS485 or small output RF, or a standardized transmission medium such as a power line and IEEE 802.11 as the transmission medium.

The network of the home network system 1 is separated from the Internet 2, for composing an independent network for connecting the electric devices through wire or wireless transmission medium. Here, the independent network includes a physically-connected but logically-divided network.

The home network system 1 includes master devices for controlling operations of the other electric devices 40 to 49 or monitoring statuses thereof, and slave devices having functions of responding to the request of the master devices and notifying their status change information. The master devices include the network managers 20 to 23, and the slave devices include the electric devices 40 to 49. The network managers 20 to 23 include information of the controlled electric devices 40 to 49 and control codes, and control the electric devices 40 to 49 according to a programmed method or by receiving inputs from the LnCP server 3 and/or the client device 4. Still referring to FIG. 1, when the plurality of network managers 20 to 23 are connected, each of the network managers 20 to 23 must be both the master device and the slave device, namely physically one device but logically the device (hybrid device) for simultaneously performing master and slave functions in order to perform information exchange, data synchronization and control with the other network managers 20 to 23.

In addition, the network managers 20 to 23 and the electric devices 40 to 49 can be connected directly to the network (power line network, RS-485 network and RF network) or through the LnCP routers 30 and 31 and/or the LnCP adapters 35 and 36.

The electric devices 40 to 49 and/or the LnCP routers 30 and 31 and/or the LnCP adapters 35 and 36 are registered in the network managers 201 to 23, and provided with intrinsic logical addresses by products (for example, 0x00, 0x01, etc.). The logical addresses are combined with product codes (for example, 0x02 of air conditioner and 0x01 of washing machine), and used as node addresses. For example, the electric devices 40 to 49 and/or the LnCP routers 30 and 31 and/or the LnCP adapters 35 and 36 are identified by the node addresses such as 0x0200 (air conditioner 1) and 0x0201 (air conditioner 2). A group address for identifying at least one electric device 40 to 49 and/or at least one LnCP router 30 and 31 and/or at least one LnCP adapter 35 and 36 at a time can be used according to a predetermined standard (all identical products, installation space of products, user, etc.). In the group address, an explicit group address is a cluster for designating a plurality of devices by setting an address option value (flag mentioned below) as 1, and an implicit group address designates a plurality of devices by filling the whole bit values of the logical addresses and/or the product codes with 1. Especially, the implicit group address is called a duster code.

Figure 2:
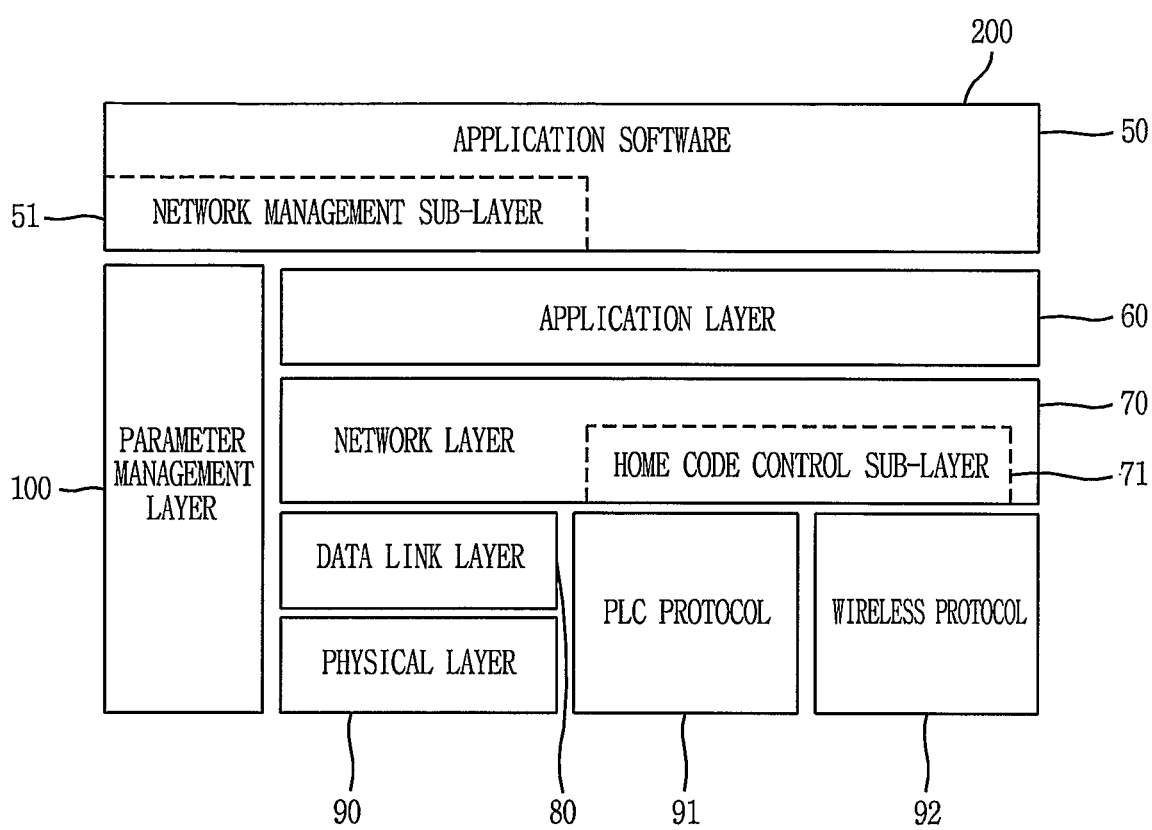
FIG. 2 is a structure view illustrating a living network control protocol stack in accordance with the present invention.

FIG. 2 is a structure view illustrating a living network control protocol stack in accordance with the present invention. The home network system 1 enables the network managers 20 to 23, the LnCP routers 30 and 31, the LnCP adapters 35 and 36 and the electric devices 40 to 49 to communicate with each other according to the living network control protocol (LnCP) of FIG. 2. Therefore, the network managers 20 to 23, the LnCP routers 30 and 31, the LnCP adapters 35 and 36 and the electric devices 40 to 49 perform network communication according to the LnCP.

As illustrated in FIG. 2, the LnCP includes an application software 50 for performing intrinsic functions of the network managers 20 to 23, the LnCP routers 30 and 31, the LnCP adapters 35 and 36 and the electric devices 40 to 49, and providing an interface function with an application layer 60 for remote controlling and monitoring on the network, the application layer 60 for providing services to the user, and also providing a function of forming information or a command from the user in the form of a message and transmitting the message to the lower layer, a network layer 70 for reliably network-connecting the network managers 20 to 23, the LnCP routers 30 and 31, the LnCP adapters 35 and 36 and the electric devices 40 to 49, a data link layer 80 for providing a medium access control function of accessing a shared transmission medium, a physical layer 90 for providing physical interfaces between the network managers 20 to 23, the LnCP routers 30 and 31, the LnCP adapters 35 and 36 and the electric devices 40 to 49, and rules for transmitted bits, and a parameter management layer 100 for setting and managing node parameters used in each layer.

In detail, the application software 50 further includes a network management sub-layer 51 for managing the node parameters, and the network managers 20 to 23, the LnCP routers 30 and 31, the LnCP adapters 35 and 36 and the electric devices 40 to 49 which access the network. That is, the network management sub-layer 51 performs a parameter management function of setting or using the node parameter values through the parameter management layer 100, and a network management function of composing or managing the network when the device using the LnCP is a master device.

When the network which the network managers 20 to 23, the LnCP routers 30 and 31, the LnCP adapters 35 and 36 and the electric devices 40 to 49 access is a dependent transmission medium such as a power line, IEEE 802.11 and wireless (for example, when the LnCP includes a PLC protocol and/or wireless protocol), the network layer 70 further includes a home code control sub-layer 71 for performing a function of setting, managing and processing home codes for logically dividing each individual network. When the individual networks are physically divided by an independent transmission medium such as RS-485, the home code control sub-layer 71 is not included in the LnCP. Each of the home codes is comprised of 4 bytes, and set as random values or designated values of the user.

Figure 3:
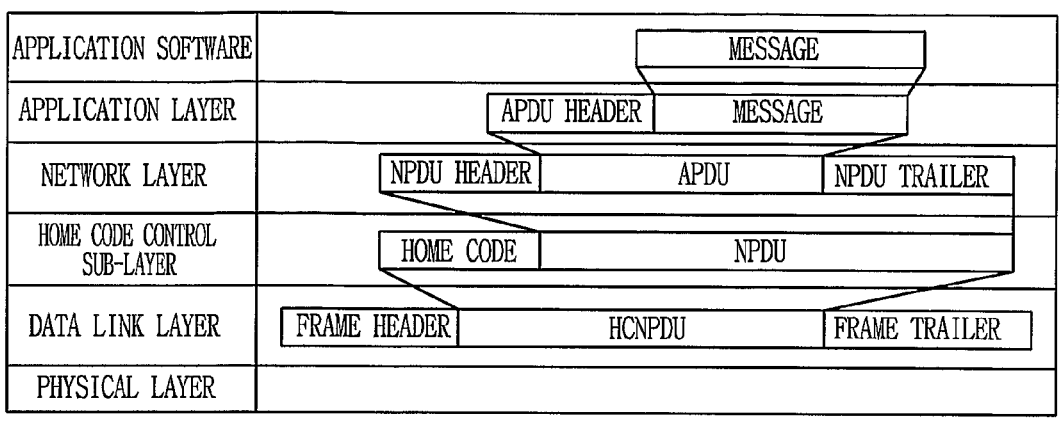
FIGS. 3 and 4 are structure views illustrating interfaces between layers of FIG. 2, respectively.
Figure 4:
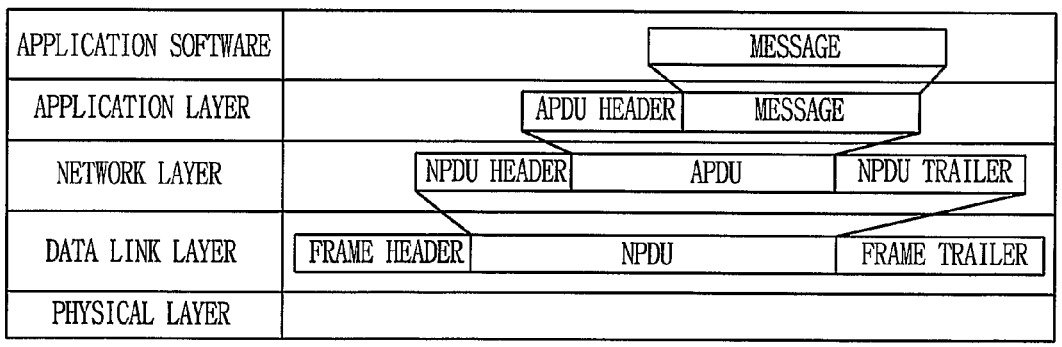

FIGS. 3 and 4 are structure views illustrating interfaces between the layers of FIG. 2, respectively.

FIG. 3 illustrates the interfaces between the layers when the physical layer 90 is connected to the non-independent transmission medium, and FIG. 4 illustrates the interfaces between the layers when the physical layer 90 is connected to the independent transmission medium.

The home network system 1 adds headers and trailers required by each layer to protocol data units (PDU) from the upper layers, and transmit them to the lower layers.

As shown in FIGS. 3 and 4, an application layer PDU (APDU) is a data transmitted between the application layer 60 and the network layer 70, a network layer PDU (NPDU) is a data transmitted between the network layer 70 and the data link layer 80 or the home code control sub-layer 71, and a home code control sub-layer PDU (HCNPDU) is a data transmitted between the network layer 70 (precisely, the home code control sub-layer 71) and the data link layer 80. The interface is formed in data frame units between the data link layer 80 and the physical layer 90.

FIGS. 5 to 10 are detailed structure views illustrating the interfaces of FIGS. 3 and 4, respectively.

Figure 5:
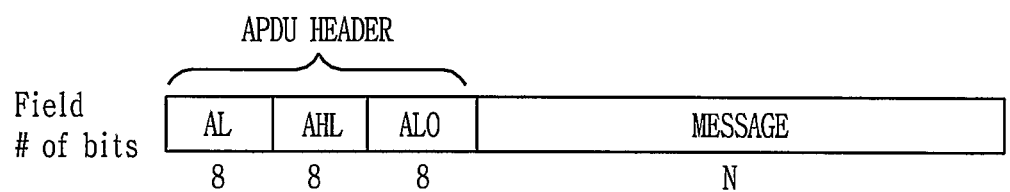
FIGS. 5 to 10 are detailed structure views illustrating the interfaces of FIGS. 3 and 4, respectively.

FIG. 5 illustrates the APDU structure in the application layer 60.

An APDU length (AL) field shows a length of the APDU (length from AL to message field), and has a minimum value of 4 and a maximum value of 77.

An APDU header length (AHL) field shows a length of an APDU header (length from AL to AL0), successfully has 3 bytes, and is extensible to 7 bytes. In the LnCP, the APDU header can be extended to 7 bytes to encode a message field and change an application protocol.

An application layer option (ALO) field extends a message set. For example, when the ALO field is set as 0, if the ALO field contains a different value, message processing is ignored.

The message field processes a control message from the user or event information, and is changed by the value of the ALO field.

Figure 6:
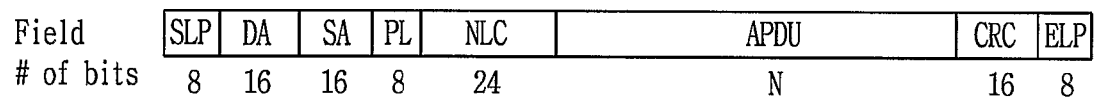
Figure 7:
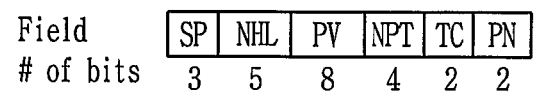

FIG. 6 illustrates the NPDU structure in the network layer 70, and FIG. 7 illustrates a detailed NLC structure of the NPDU.

A start of LnCP packet (SLP) field indicates start of a packet and has a value of 0x02.

Destination address (DA) and source address (SA) fields are node addresses of a receiver and a sender of a packet, and have 16 bits, respectively. The most significant 1 bit includes a flag indicating a group address, the succeeding 7 bits include a kind of a product (product code), and the lower 8 bits include a logical address for distinguishing the plurality of network managers 20 to 23 of the same kind and the plurality of electric devices 40 to 49 of the same kind. A packet length (PL) field shows the total length of NPDU which will be transferred, and its initial length is 15 bytes and its maximum length is 120 bytes.

A service priority (SP) field gives transmission priority to a transmission message and has 3 bits. Table 2 shows the priority of each transmission message.

When a slave device responds to a request of a master device, the slave device takes the priority of the request message from the master device.

TABLE 2

| Priority | Value | Message type |
| --- | --- | --- |
| High | 0 | Security related message |
| Middle | 1 | When a normal packet is transmitted |
| | | When an event message for online or offline status change is transmitted |
| Normal | 2 | When a notification message for composing a network is transmitted |
| | | When a normal event message is transmitted |
| Low | 3 | When a data is transmitted by download or upload mechanism |

An NPDU header length (NHL) field extends an NPDU header (NLC field of SLP), successfully has 9 bytes, and is extended to a maximum of 17 bytes.

A protocol version (PV) field indicates the employed protocol version and its length is 1 byte. The upper 4 bits show the version, and the lower 4 bits show the sub-version. Version and sub-version use HEX to show their values respectively.

A network layer packet type (NPT) field is a 4-bit field for distinguishing a kind of a packet in the network layer 70. The LnCP Includes a request packet, a response packet and a notification packet. The NPT field of a master device must be set as the request packet or the notification packet, and the NPT field of a slave device must be set as the response packet or the notification packet Table 3 shows NPT values by kinds of packets.

TABLE 3

| Explanation | Value |
| --- | --- |
| Request packet | 0 |
| reserved | 1-3 |
| Response packet | 4 |
| reserved | 5-7 |
| Notification packet | 8 |
| reserved | 9-12 |
| Reserved value for interface with the home code control sub-layer | 13-15 |

A transmission counter (TC) field is a 2 bit field which retransmits the request packet or repeatedly transfers notification packet in order to enhance the transmission success rate of the notification packet when a communication error occurs in the network layer 70, making it unable to transfer the request packet or response packet property. Table 4 shows the range of the values of the TC field by the NPT values.

TABLE 4

| Kind of packet | Value (range) |
| --- | --- |
| Request packet | 1-3 |
| Response packet | 1 |
| Notification packet | 1-3 |

A packet number (PN) field consists of 2 bytes, and it is used with the TC to detect duplicated packets in the slave device, and it is used to deal with multiple communication cycles in the master device. Table 5 shows the range of the values of the PN field by the NPT values.

TABLE 5

| Kind of packet | Value (range) |
| --- | --- |
| Request packet | 0-3 |
| Response packet | Copy a PN field value of a request packet |
| Notification packet | 0-3 |

An APDU field is a protocol data unit of the application layer 60 transmitted between the application layer 60 and the network layer 70. The APDU field has a minimum value of 0 byte and a maximum value of 88 bytes.

A cyclic redundancy check (CRC) field is a 16-bit field for checking an error of a received packet (from SLP to APDU).

An end of LnCP packet (ELP) field is the end of the packet with the value 0x03. If the ELP field is not detected in spite of byte length of the received data is the same with the value of packets length field, this packet will be considered as an error packet.

Figure 8:

FIG. 8 illustrates the HCNPDU structure in the home code control sub-layer 71.

As depicted in FIG. 8, a home code (HC) field is added to the upper portion of the NPDU.

The home code is comprised of 4 bytes, and has a unique value within the line distance where a packet can be transmitted.

Figure 9:
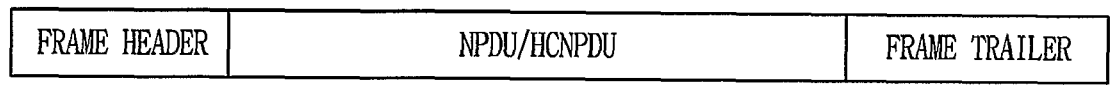

FIG. 9 illustrates a frame structure in the data link layer 80.

The structure of the header and the trailer of the data link layer frame of the LnCP is changed according to transmission media. When the data link layer 80 uses a non-standardized transmission medium, the header and the trailer of the frame must have null fields, and when the data link layer 80 uses a standardized transmission medium, the header and the trailer of the frame are formed as prescribed by the protocol. An NPDU field is a data unit transmitted from the upper network layer 70, and an HCNPDU field is a data unit obtained by adding 4 bytes of home code to the front portion of the NPDU, when the physical layer 90 is a dependent transmission medium such as a power line or IEEE 802.11. The data link layer 80 processes the NPDU and the HCNPDU in the same manner.

Figure 10:
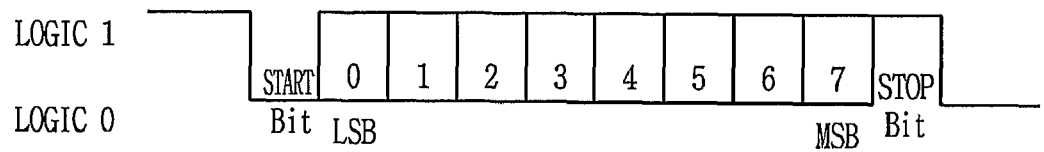

FIG. 10 illustrates a frame structure in the physical layer 90.

The physical layer 90 of the LnCP handles a function of transmitting and receiving a physical signal to a transmission medium. The data link layer 80 can use a non-standardized transmission medium such as RS-485 or small output RF or a standardized transmission medium such as a power line or IEEE. 802.11 as the physical layer 90 of the LnCP. The home network system 1 using the LnCP employs a universal asynchronous receiver and transmitter (UART) frame structure and a signal level of RS-232, so that the network managers 20 to 23 and the electric devices 40 to 49 can interface with RS-485, the LnCP routers 30 and 31 or the LnCP adapters 35 and 36. When the UART is connected between the devices by using a serial bus, the UART controls flow of bit signals on a communication line. In the LnCP, a packet from the upper layer is converted into 10 bits of UART frame unit as shown in FIG. 10, and transmitted trough the transmission medium. The UART frame includes one bit of start bit, 8 bits of data and one bit of stop bit without any parity bit. The start bit is transmitted first, followed by data bits and the stop bit. When the home network system 1 using the LnCP employs the UART, it does not have additional frame header and frame trailer.

The node parameters used in the aforementioned layers will now be explained.

Data types of the node parameters mentioned below correspond to one of a few data types of Table 6.

TABLE 6

| Notation | Data type | Description |
| --- | --- | --- |
| char | signed char | 1 byte when data length is not stated |
| uchar | unsigned char | 1 byte when data length is not stated |
| int | signed int | 2 bytes when data length is not stated |
| uint | unsigned int | 2 bytes when data length is not stated |
| long | signed long | 4 bytes when data length is not stated |
| ulong | unsigned long | 4 bytes when data length is not stated |
| string | string | A character string data where the last byte is NULL |
| FILE | — | A data having a file structure |

The network layer 70 performs the following functions.

First, the network layer 70 performs an address management function, namely stores its address and an address of the destination network manager 20 to 23 or the destination electric device 40 to 49. Here, the network layer 70 can designate a duster address by using information and location information of the network manager 20 to 23 or the electric device 40 to 49 included in the address, and support multicasting and broadcasting communication.

Second, the network layer 70 performs a flow control function, namely manages a communication cycle and controls flow of a packet.

Third, the network layer 70 performs an error control function. That is, when the network layer 70 does not receive a response packet within a set time, the network layer 70 retries a data. A retry count is maximally 3.

Fourth, the network layer 70 performs a transaction control function, namely prevents duplicate transaction of the same message by checking a duplicate packet, and controls simultaneous communication cycles.

Fifth, the network layer 70 performs a routing control function, namely transmits a packet between at least two independent transmission media, and controls flow of a packet to prevent an infinite loop between the LnCP routers 30 and 31 and the LnCP adapters 35 and 36.

The network layer 70 provides services in communication cycle units. The communication cycles are classified into {1-Request, 1-Response}, {1-Request, Multi-Responses}, {1-Notification} and {Repeated-Notification}.

In the {1-Request, 1-Response} communication cycle, one master device transmits one request packet to one slave device, and the slave device transmits one response packet to the master device as a response.

In the {1-Request, Multi-Responses} communication cycle, one master device transmits one request packet to a plurality of slave devices, and each of the slave devices sequentially transmits a response packet to the request packet.

In the {1-Notification} communication cycle, a (master or slave) device transmits one notification packet to one or a plurality of (master or slave) devices, and directly ends communication.

In the {Repeated-Notification} communication cycle, in order to obtain transmission reliability of the {1-Notification} communication cycle, the same packet is repeatedly transmitted and communication is ended.

Table 7A shows relations among the aforementioned communication cycles, packet types and transmission services (or network layer services).

TABLE 7A

| Communication cycle | Packet type | NL service |
|---|---|---|
| {1-Request, 1-Response} | Request packet-Response packet | Acknowledged(0) |
| {1-Request, Multi-Responses} | Request packet-Response packet | Acknowledged(0) |
| {1-Notification} | Notification packet | Non-Acknowledged(1) |
| {Repeated-Notification} | Notification packet | Repeated-Notification(2) |

Table 7B shows node parameter values used in the network layer 70.

TABLE 7B

| Name | Type | Explanation |
|---|---|---|
| Product code | uchar ProductCode | A code for combining individual functions of products |
| Logical address | uchar NP_LogicalAddress | An one-byte address for distinguishing a plurality of products having the same product code |
| Cluster code | uchar NP_ClusterCode | An one-byte address for distinguishing clusters of a device |
| Home code | ulong NP_HomeCode | A 4-byte value for defining a home code of a device |
| Maximum retry time | constant uchar SendRetries | In an acknowledged service, a maximum retry time of a request packet, or in a repeated-notification service, a retry time |
| Transmission timeout | constant uint SendTimeOut | A time (ms) taken for the network layer 70 to transmit an NPDU to the data link layer 80 and receive DLLCompleted primitive, 1000 ms |
| Response delay time | uint ResDelayTime | The random delay time before response packet is ransferred by the slave device who received request packet, when acknowledged transmission service with group address is running, random value within the range of 0-5000 ms |
| Maximum repeater delay time | constant uint RepeaterDelayTime | The maximum time permitted for the normal packet to be sent to the receiver when the network is normally functioning, 5000 ms |
| Duplicate packet elapsed time | constant uint DupElapsedTime | This is the minimum interval time between request packets which secures every packet independence, when the slave device receives the request packets continuously from the same master device, 10000 ms |

Figure 11:
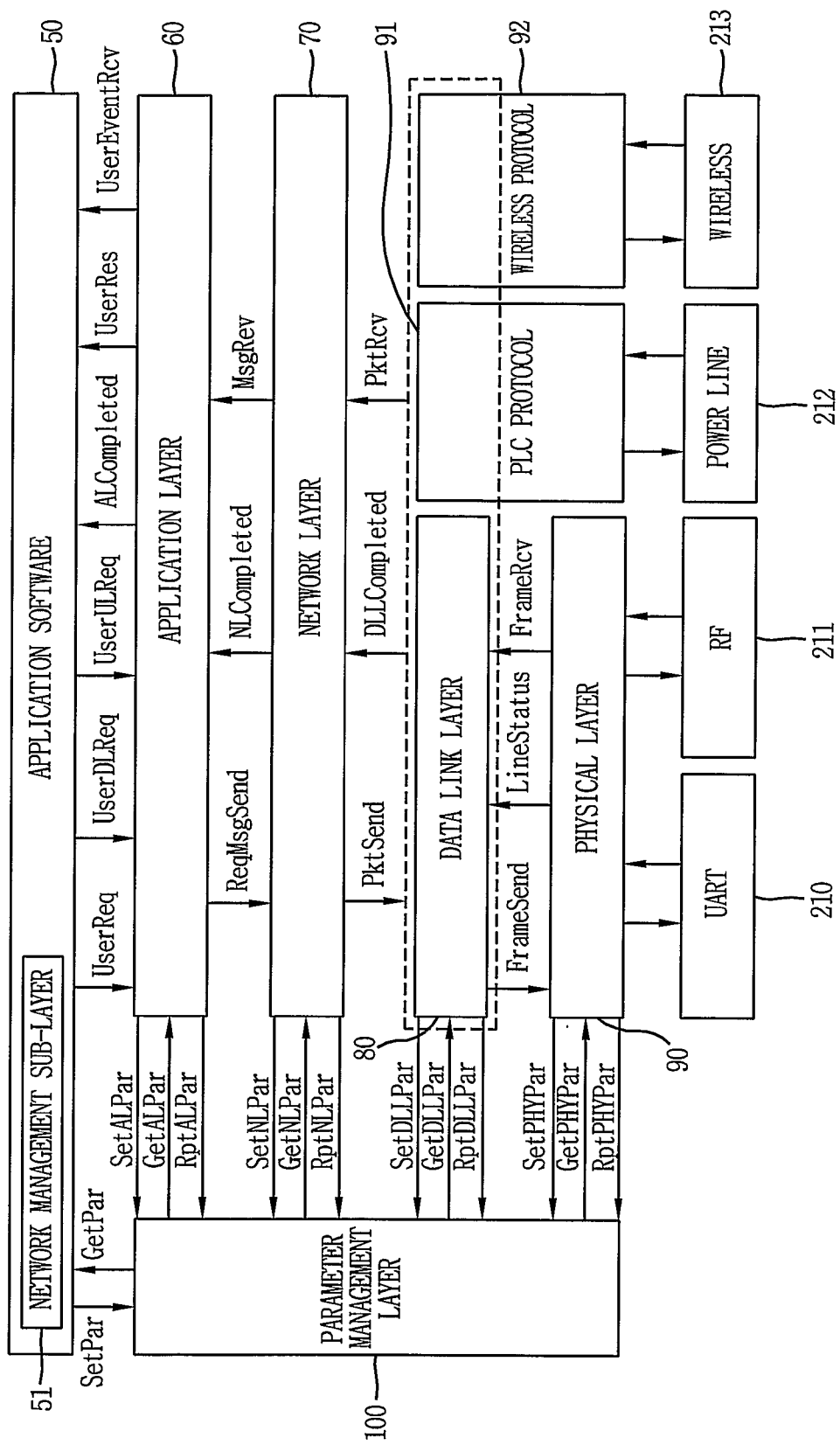
FIGS. 11 and 12 are structure views illustrating primitives for transmitting data exchanged between the layers.
Figure 12:
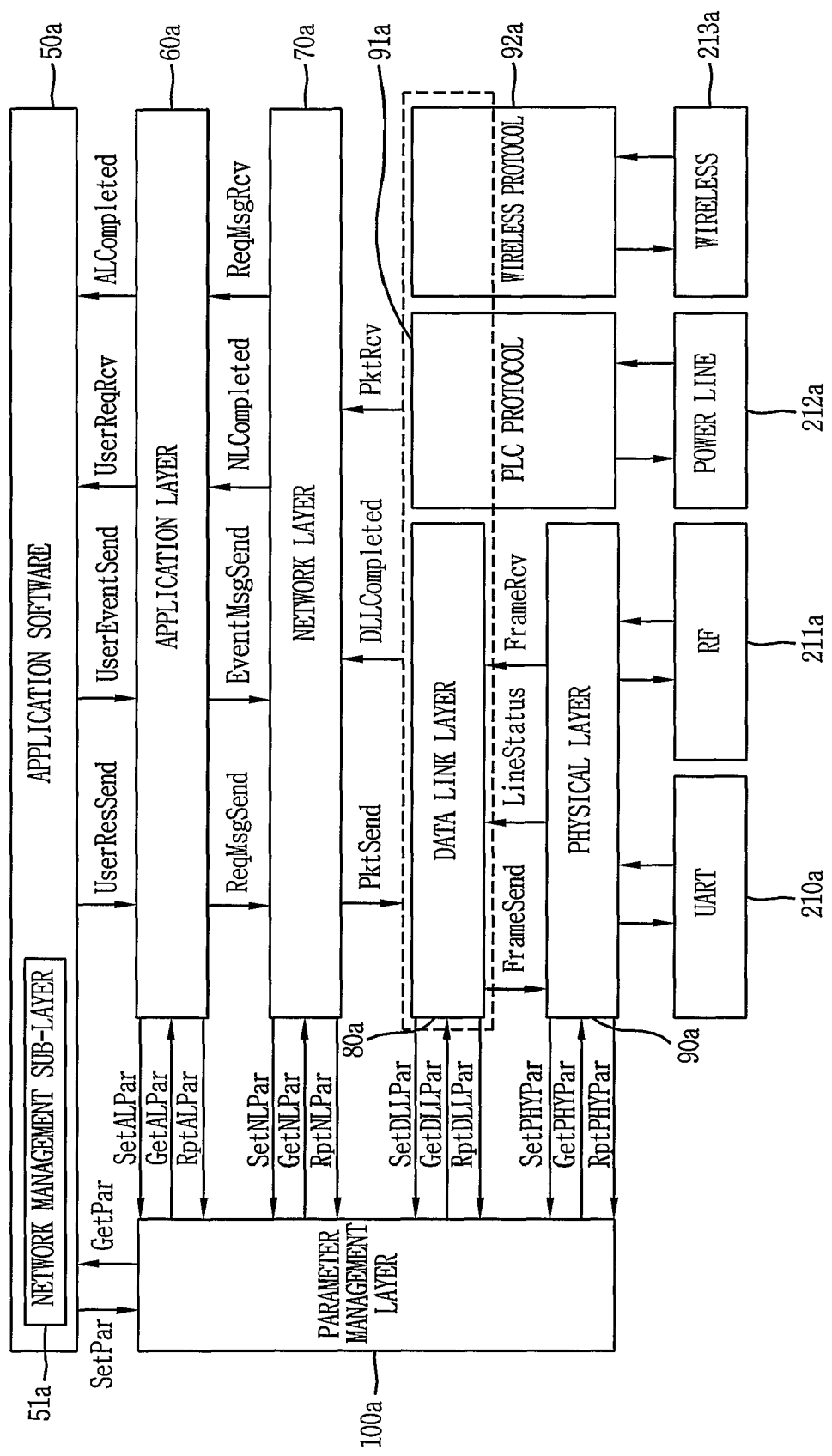

FIGS. 11 and 12 are structure views Illustrating primitives for transmitting data exchanged between the layers.

FIG. 11 illustrates transmission of the primitives between the layers of the master device.

As shown in FIG. 11, the primitives between the application software 50 and the application layer 60 include User-Req, UserDLReq, UserULReq, ALCompleted, UserRes and UserEventRcv. These primitives will not be explained further.

As shown in the drawing, the primitives between the application layer 60 and the network layer 70 include ReqMsgSend, NLCompleted and MsgRev.

The request message sending primitive ReqMsgSend is a primitive for transmitting a message from the application layer 60 of the master device to the network layer 70, and includes constitutional elements of Table 8A.

TABLE 8A

| Name | Type | Explanation |
| --- | --- | --- |
| Product code | uchar ProductCode | A code for combining individual functions of products |
| Logical address | uchar NP_LogicalAddress | An one-byte address for distinguishing a plurality of products having the same product code |
| Cluster code | uchar NP_ClusterCode | An one-byte address for distinguishing clusters of a device |
| Home code | ulong NP_HomeCode | A 4-byte value for defining a home code of a device |
| Maximum retry time | constant uchar SendRetries | In an acknowledged service, a maximum retry time of a request packet, or in a repeated-notification service, a retry time |
| Transmission timeout | constant uint SendTimeOut | A time (ms) taken for the network layer 70 to transmit an NPDU to the data link layer 80 and receive DLLCompleted primitive, 1000 ms |
| Response delay time | uint ResDelayTime | The random delay time before response packet is ransferred by the slave device who received request packet, when acknowledged transmission service with group address is running, random value within the range of 0-5000 ms |
| Maximum repeater delay time | constant uint RepeaterDelayTime | The maximum time permitted for the normal packet to be sent to the receiver when the network is normally functioning, 5000 ms |
| Duplicate packet elapsed time | constant uint DupElapsedTime | This is the minimum interval time between request packets which secures every packet independence, when the slave device receives the request packets continuously from the same master device, 10000 ms |

Here, the communication cycle identifier CycleID is generated by combining the application service code ALSvcCode and the node address of the receiver device.

The message receiving primitive MsgRcv is a primitive for transmitting a packet from the network layer 70 of the master device to the application layer 60, and includes constitutional elements of Table 8B.

TABLE 8B

| Name | Type | Description |
| --- | --- | --- |
| Communication cycle identifier | ulong CycleID | An ID number of a communication cycle in a master device |
| Event response message | uchar *ResEventAPDU | An APDU transmitted to the application layer 60 |
| Length of event response message | uchar APDULength | A byte data length of an APDU |
| Destination address | uint DstAddress | An address of a receiver device |
| Source address | uint SrcAddress | An address of a sender device |

The structure of the communication cycle identifier CycleID will be explained later.

The network layer completing primitive NLCompleted is a primitive for notifying a packet processing status from the network layer 70 to the application layer 60, and includes constitutional elements of Table 8C.

TABLE 8C

| Name | Type | Explanation |
| --- | --- | --- |
| Communication cycle identifier | ulong CycleID | An ID number of a communication cycle in a master device |
| transmission result | uchar NLResult | If communication cycle is completed successfully, this value will be CYCLE_OK(1), if not, it will be CYCLE_FAILED(0) |
| Failure reason code | uchar NLFailCode | The classified value of the reason of failure when the value of the NLResult is CYCLE_FAILED |
| Retry number | uchar NLSuccessCode | The number of retransmission times when the value of the NLResult is CYCLE_OK |

As shown in FIG. 11, the primitives between the network layer 70 and the data link layer 80 include PktSend, PktRcv and DLLCompleted.

The packet sending primitive PktSend is a primitive for transmitting a packet from the network layer 70 to the data link layer 80, and includes constitutional elements of Table 9A.

TABLE 9A

| Name | Type | Description |
| --- | --- | --- |
| Packet | uchar *NPDU/HCNPDU | A packet of the network layer 70 |
| Length of packet | uchar NPDULength | A byte data length of an NPDU/HCNPDU |
| Service priority | uchar SvcPriority | Transmission priority |

The packet receiving primitive PktRcv is a primitive for transmitting a packet from the data link layer 80 to the network layer 70, and includes constitutional elements of Table 9B.

TABLE 9B

| Name | Type | Description |
| --- | --- | --- |
| Packet | uchar *PDU | A packet of the network layer 70 |
| Length of packet | uchar PDULength | A byte data length of a PDU |

The data link layer completing primitive DLLCompleted is a primitive for notifying a packet transmission result from the data link layer 80 to the network layer 70, and includes constitutional elements of Table 9C.

TABLE 9C

| Name | Type | Explanation |
| --- | --- | --- |
| Packet transmission result | uchar DLLResult | Packet transmission result, if packet transmission process is completed successfully, the result is SEND_OK(1); if not, it will be SEND_FAILED(0) |
| Transmission failure reason | uchar DLLFailCode | Code for the cause of failure when DLLResult is SEND_FAILED(0) |

At last, the primitives between the data link layer 80 and the physical layer 90 include FrameSend, FrameRcv and RptLineStatus. These primitives will not be explained further.

FIG. 12 illustrates transmission of the primitives between the layers of the slave device.

The primitives between the application software 50a and the application layer 60a include UserReqRcv, UserResSend and UserEventSend. These primitives will not be explained further.

Still referring to FIG. 12, the primitives between the application layer 60a and the network layer 70a include ReqMsgRcv, ResMsgSend, EventMsgSend and NLCompleted.

The request message receiving primitive ReqMsgRcv is a primitive for transmitting a received request message from the network layer 70a to the application layer 60a, and includes constitutional elements of Table 10A.

TABLE 10A

| Name | Type | Explanation |
| --- | --- | --- |
| Request message | uchar *ReqAPDU | An APDU transmitted to the application layer 60a |
| Length of request message | uchar APDULength | A byte data length of an APDU |
| Destination address | uint DstAddress | An address of a receiver device |
| Source address | uint SrcAddress | An address of a sender device |
| Network layer service | uchar NLService | Communication cycle service types of a slave device 0: Acknowledged, 1: Non-acknowledged |
| Duplicate packet check result | uchar DuplicateCheck | If there is no duplicate packet, it will be NORMAL_PKT(1), if not, it will be DUPLICATED_PKT(0) |

The response message sending primitive ResMsgSend is a primitive for transmuting, a response message from the application layer 60a to the network layer 70a, and includes constitutional elements of Table 10B.

TABLE 10B

| Name | Type | Description |
| --- | --- | --- |
| Communication cycle identifier | ulong CycleID | An ID number of a communication cycle in a slave device |
| Response message | uchar *ResAPDU | An APDU including a response message generated in the application layer 60 of a slave device |

TABLE 10B-continued

| Name | Type | Description |
| --- | --- | --- |
| Length of response message | uchar APDULength | A byte data length of an APDU |

The event message sending primitive EventMsgSend is a primitive for transmitting an event message from the application layer 60a to the network layer 70a, and includes constitutional elements of Table 10C.

TABLE 10C

| Name | Type | Explanation |
| --- | --- | --- |
| Communication cycle identifier | ulong CycleID | An ID number of a communication cycle in a slave device |
| Event message | uchar *EventAPDU | An APDU including an event message generated in the application layer 60 of a slave device |
| Length of event message | uchar APDULength | A byte data length of an APDU |
| Destination address | uint DstAddress | Address of a receiver device |
| Source address | uint SrcAddress | Address of a sender device |
| Network layer service | uchar NLService | Transmission services in the network layer 70a 1: Non-acknowledged, 2: Repeated-notification |
| Transmission Interval between repeated notification messages | uchar RepNotiInt | When the NLService is chosen as Repeated-notification, the interval time between two continued notification packets |
| Service priority | uchar SvcPriority | Transmission priority of an event message |

The network layer completing primitive NLCompleted is a primitive for notifying a packet processing status from the network layer 70a to the application layer 60a, and includes constitutional elements of Table 10D.

TABLE 10D

| Name | Type | Explanation |
| --- | --- | --- |
| Communication cycle identifier | ulong CycleID | An ID number of a communication cycle in a slave device |
| Transmission result | uchar NLResult | If communication cycle is completed successfully, the value will be CYCLE_OK(1), if not, it will be CYCLE_FAILED(0) |
| Failure reason code | uchar NLFailCode | The classified value of the reason of failure when the value of the NLResult is CYCLE_FAILED |
| Retry number | uchar NLSuccessCode | The number of retransmission times when the value of the NLResult is CYCLE_OK |

The primitives between the network layer 70a and the data link layer 80a of the slave device and the primitives between the data link layer 80a and the physical layer 90a of the slave device are used in the same manner as the primitives of the master device of FIG. 11.

Figure 13:
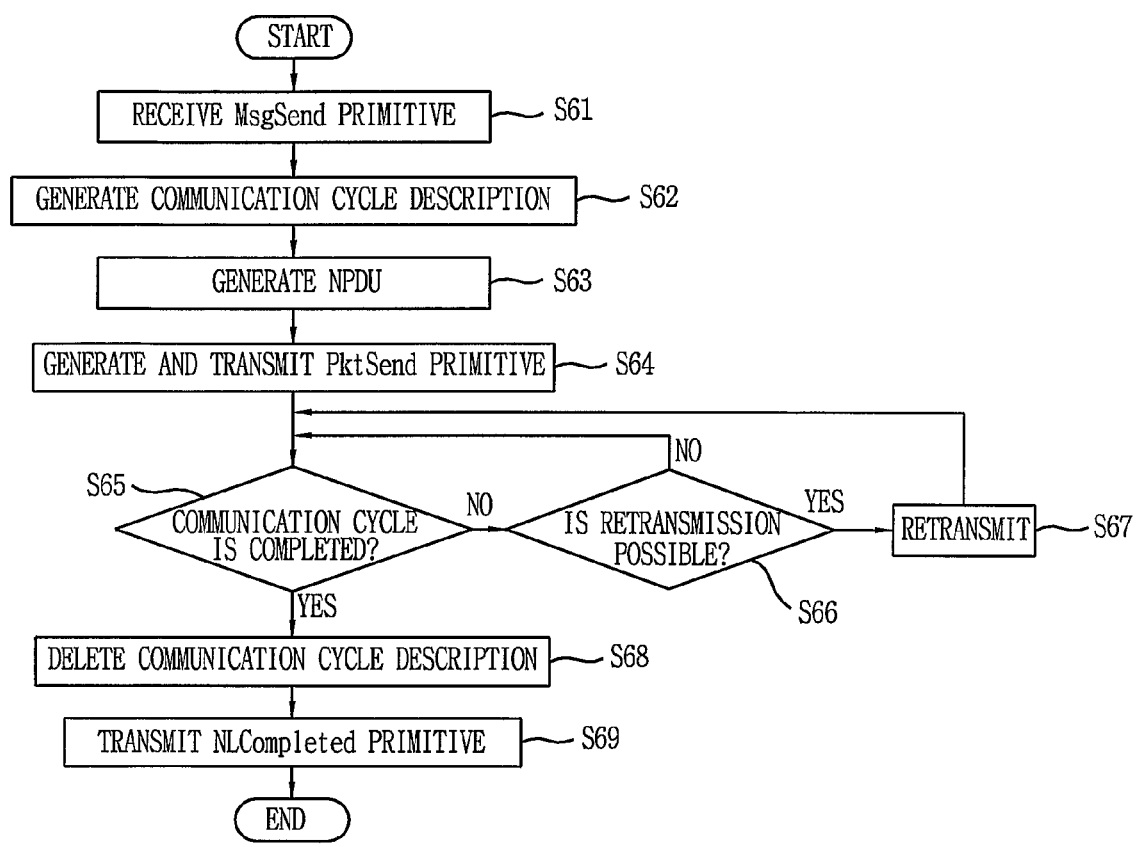
FIG. 13 is a flow chart for describing a data processing method in accordance with a first embodiment of the present invention.

FIG. 13 is a flow chart for describing a data processing method according to a first embodiment of the present invention.

To be brief, the first embodiment of the data processing method describes how a request packet of a master device and a notification packet of a slave device are processed at the network layers 70 and 70a to be transmitted from the application layers 60 and 60a to the data link layers 80 and 80a, respectively. This method handles the APDU receiving between the network layers 70 and 70a and the application layers 60 and 60a, and the NPDU transmission between the network layers 70 and 70a and the data link layers 80 and 80a.

In step S61, the network layer 70 of a master device receives a request message sending primitive ReqMsgSend (i.e., a request message or packet) from the application layer 60. Also, the network layer 70a of a slave device receives an event message sending primitive EventMsgSend (i.e., a notification message or packet) from the application layer 60a. The network layers 70 and 70a estimate an elapsed time ElapsedTime from the point of receiving the primitive.

In step S62, the network layer 70 of the master device generates a communication cycle description having the structure shown in Table 11 below, according to the request message sending primitive ReqMsgSend from the application layer 60. The variables in the communication cycle description are set as follows.

To begin with, there is a communication cycle identifier CycleID, which is a communication cycle ID included in the request message sending primitive ReqMsgSend. Next, a communication cycle type CycleType indicates a type of the communication cycle. For instance, when the network layer service NLService included in the request message sending primitive ReqMsgSend is a non-acknowledged or a repeated-notification service, the communication cycle type CycleType is set to 1-notification(2) or repeated-notification(3), respectively. Also, when the network layer service NLService is an acknowledged service and when the destination address DstAddress designates a single receiver, the communication cycle type CycleType is set to 1-request, 1-response(0). Furthermore, when the network layer service NLService is an acknowledged service and when the destination address DstAddress indicates a group address, the communication cycle type CycleType is set to 1-request, multi-response(1). Next, a connector address ConnectorAddr is a destination address DstAddress included in the request message sending primitive ReqMsgSend. During packet (or message) transmission, the address of a receiver is the connector address ConnectorAddr, whereas during packet (or message) receiving, the address of a sender is the connector address ConnectorAddr. A packet number PacketNo is a value obtained by the addition of '1' to a value used in the most recent completed communication cycle. If the addition result is greater than '4', the packet number PacketNo is set to '0'. A network layer service NLService refers to a network layer service included in the request message sending primitive ReqMsgSend. A service priority SvcPriority (this is identical with the transmission priority) refers to a transmission priority included in the request message sending primitive ReqMsgSend. Next, there is a timeout TimeOut which is also included in the request message sending primitive ReqMsgSend. Here, the timeout TimeOut must be longer than transmission timeout (SendTimeOut) (i.e., 1000 ms) which is the waiting time for a data link layer completing primitive DLLCompleted. A transmission number TransmissionNo indicates how many times the same APDU is transmitted, provided that the communication cycle type is one of 1-request, 1-response and repeated-notification. The initial value of the transmission number TransmissionNo is '1'. The APDU can be retransmitted as many as three times defined in the maximum retry time SendRetries, one of the parameters of the network layer 70. Next, an elapsed time ElapsedTime refers to an amount of time that has lapsed since the network layer 70 received a new communication cycle identifier CycleID from the application layer 60. The initial value of the elapsed time ElapsedTime is '0', and the value of the elapsed time ElapsedTime is continuously updated until the communication cycle is completed. Lastly, a response receiving state ResRcvState indicates whether a response packet is received in response to a request packet transmitted. The initial value of the response receiving state ResRcvState is NOT_RECEIVED, and when the response packet is received, RES_RECEIVED.

TABLE 11

| Parameter | Size | Description |
| --- | --- | --- |
| CycleID | 4 bytes | A cycle communication identifier<br>This is transferred with the APDU from the application layer 60. |
| CycleType | 1 byte | Type of a communication cycle<br>0: 1-request, 1-response, 1: 1-request, multi-response<br>2: 1-notification, 3: Repeated-notification<br>This is transferred with the APDU from the application layer 60. |
| ConnectorAddr | 2 bytes | An address of the other part of communication;<br>An address of a receiver during packet transmission, and an address of a sender during packet receiving |
| PacketNo | 1 byte | A packet number. Whenever a new communication cycle is performed, different 0-3 packet numbers are rendered. |
| NLService | 1 byte | A kind of request transmission service of the application layer 60;<br>This is transferred with the APDU from the application layer 60. |
| SvcPriority | 1 byte | A sending priority.<br>This is transferred with the APDU from the application layer 60. |
| TimeOut | 2 bytes | In case of a request packet, a ResponseTimeOut (a waiting time for a response packet following the packet transmission);<br>In case of a notification packet, a RepNotiInt (Transmission interval between repeated notification packets) |
| TransmissionNo | 1 byte | When a communication cycle is one of 1-request, 1-response and repeated-notification, a number of transmissions of the same APDU, Initial value = 1; Maximum number of APDU retransmission attempts is 3 as defined in SendRetries, one of parameters of the network layer 70. |
| ElapsedTime | 2 bytes | An amount of time (ms) that has lapsed since a new CycleID was received from the application layer 60, Initial value = 0; The value is continuously updated until the communication cycle is completed. |
| ResRcvState | 1 byte | When a request packet is transmitted, a state whether a response packet is received, Initial value is NOT_RECEIVED, and when the response packet is received, RES_RECEIVED. |

Here, TransmissionNo, ElapsedTime and ResRcvState can optionally be included. TimeOut Indicates either ResponseTimeOut or RepNotiInt, depending on the nature of a primitive it belongs. In particular, TimeOut in this embodiment indicates the ResponseTimeOut.

Similarly, when an event message sending primitive EventMsgSend is transferred from the application layer 60a, the network layer 70a of a slave device generates a communication cycle description having variables below.

First of all, there is a communication cycle identifier CycleID, which is a communication cycle ID included in the event message sending primitive EventMsgSend. Next, a communication cycle type CycleType indicates a type of the communication cycle. For instance, when the network layer service NLService included in the event message sending primitive EventMsgSend is a non-acknowledged or a repeated-notification service, the communication cycle type CycleType is set to 1-notification(2) or repeated-notification (3), respectively. Next, a connector address ConnectorAddr is a destination address DstAddress included in the event message sending primitive EventMsgSend. A packet number PacketNo is a value obtained by the addition of '1' to a value the most recent completed communication cycle used if the addition result is '3', the packet number PacketNo is set to '0'. A network layer service NLService refers to a network layer service included in the event message sending primitive EventMsgSend. A service priority SvcPriorty refers to a transmission priority included in the event message sending primitive EventMsgSend. Next, there is a timeout TimeOut which is also included in the event message sending primitive EventMsgSend. Here, the timeout TimeOut means a transmission interval RepNotiInt between repeated notification messages. A transmission number TransmissionNo indicates how many times the same APDU is transmitted, provided that the communication cycle type is one of 1-notification(2) and repeated-notification(3). The initial value of the transmission number TransmissionNo is '1'. Next, an elapsed time ElapsedTime refers to an amount of time that has lapsed since the network layer 70 received a new communication cycle identifier CycleID from the application layer 60a. The initial value of the elapsed time ElapsedTime is '0', and the value of the elapsed time ElapsedTime is continuously updated until the communication cycle is completed. Lastly, a response receiving state ResRcvState indicates whether a response packet is received in response to a request packet transmitted, and has a value of NOT_RECEIVED.

Table 12 shows relations among the communication cycles, the packet types and the network layer services.

TABLE 12

| Communication cycle | Packet type | NLService |
| --- | --- | --- |
| 1-request, 1-response | Request packet-Response packet | Acknowledged (0) |
| 1-request, multi-response | Request packet-Response packet | Acknowledged (0) |
| 1-notification | Notification packet | Non-acknowledged (1) |
| Repeated-notification | Notification packet | Repeated-notification (2) |

Referring back to FIG. 13, in step S63, the network layers 70 and 70a generate NPDUs, respectively, using the variables of the corresponding communication cycle descriptions and adding headers and trailers of the NPDUs to the APDUs. Field values of the headers are set as follows.

In each header, SA field includes a node address of a sender, PL field (NPDU length) includes a value obtained by the addition of '13' to the APDULength value included in the primitive from the application layers 60 and 60a, respectively, and PV field (protocol version) includes a value of 0x20 (version 2.0). Other fields include the values available in the communication cycle descriptions. Then, the network layers 70 and 70a add the APDUs included in the primitives from the application layers 60 and 60a to the headers, and the trailers of the NPDUs, so that ELP field includes 0x01 and CRC field includes a value of CCITT-16 standard generating polynomial, respectively.

In step S64, after generating an NPDU, the network layer 70 of the master device immediately transmits a packet sending primitive PktSend including the NPDU to the data link layer 80, according to the network layer service NLService set in the communication cycle description. At the same time, the NPDU is stored for use in retransmission later on.

Similarly, after generating an NPDU, the network layer 70a of the slave device transmits a packet sending primitive PktSend including the NPDU to the data link layer 80a, according to the CycleType value set in the cycle communication description. For instance, when the communication cycle type CycleType is 1-request or multi-response, the network layer 70a of the slave device transmits the NPDU to the data link layer 80a after a delay of response delay time ResDelayTime. On the other hand, when the communication cycle type CycleType is repeated-notification, the network layer 70a of the slave device stores the NPDU for use in retransmission later on. As for other types of communication cycle, the network layer 70a of the slave device immediately transmits the NPDU to the data link layer 80a.

When the NPDU transmission is over, the network layers 70 and 70a of the master device and the slave device enter the completion of the current communication cycles, respectively.

In step S65, the network layers 70 and 70a decide the completion of communication cycle controls. Once a decision is made on the communication cycle completion, the network layers 70 and 70a of the master device and the slave device proceed to step S68, regardless of success or failure in the completion of communication cycle control, and if not, they proceed to step S66.

In detail, the network layer 70 of the master device decides that the communication cycle, control is successfully completed if:

(i) in the 1-request, 1-response communication cycle, the response receiving state ResRcvState is RES_RECEIVED;

(ii) in the 1-request, multi-response communication cycle, the response receiving state ResRcvState is RES_RECEIVED and the elapsed time ElapsedTime value is greater than the timeout TimeOut value;

(iii) in the 1-notification communication cycle, the data link layer completing primitive DLLCompleted including a SEND_OK value is transferred from the data link layer, and (iv) during the execution of the repeated-notification communication cycle, the data link layer completing primitive DLLCompleted including a SEND_OK value is transferred from the data link layer.

Meanwhile, the network layer 70 of the master device decides that the communication cycle control is failed if:

(i) in the 1-request, 1-response communication cycle, the transmission number TransmissionNo value in the communication cycle description is greater than the maximum retry time SendRetries (i.e., 3), one of the parameters of the network layer 70;

(ii) in the 1-request, multi-response communication cycle, the response receiving state ResRcvState is NOT_RECEIVED, and the elapsed time ElapsedTime value is greater than the timeout TimeOut value;

(iii) in the 1-notification communication cycle, the data link layer completing primitive DLLCompleted including the SEND_FAILED is transferred from the data link layer 80;

(iv) in the 1-notification communication cycle, the data link layer completing primitive DLLCompleted from the data link layer 80 is not transferred for the transmission timeout SendTimeOut, one of the parameters of the network layer 70;

(v) during the execution of the repeated-notification communication cycle, only the data link layer completing primitive DLLCompleted including the SEND_FAILED is transferred from the data link layer 80; and (vi) during the execution of the repeated-notification communication cycle, the data link layer completing primitive DLLCompleted from the data link layer 80 is not transferred for the transmission timeout SendTimeOut, one of the parameters of the network layer 70, for the entire packet transmission.

Meanwhile, the network layer 70a of the slave device decides that the communication cycle is successfully completed when the data link layer 80a sends the data link layer completing primitive DLLCompleted including the SEND_OK value after a notification packet has been transmitted thereto.

In contrast, the network layer 70a of the slave device decides that the communication cycle is failed when the data link layer 80a sends the data link layer completing primitive DLLCompleted including the SEND_FAILED value after a notification packet has been transmitted thereto, or the network layer 70a has not received the data link layer completing primitive DLLCompleted from the data link layer 80a for the transmission timeout SendTimeOut.

In step S66, when the communication cycles are not completed, the network layers 70 and 70a decide whether retransmissions are required. If retransmission conditions are met, the network layers 70 and 70a proceed to step S67, and if not, they proceed to step S65 so as to decide, again, whether the communication cycle has been completed.

In detail, after transmitting the request packet, if the communication cycle the master device executes is one of the 1-request, 1-response and the repeated-notification, the master device can get involved in the retransmission of NPDU up to twice. Entry conditions for the retransmission process of the master device are:

(i) if the TransMissionNo, one of the variables of the communication cycle description, is lower or equal to 3, and the elapsed time ElapsedTime value is greater than the timeout TimeOut value;

(ii) if the TransMissionNo, one of the variables of the communication cycle description, is lower or equal to 3, and the master device has received the data link layer completing primitive DLLCompleted including the SEND_FAILED from the data link layer 80; and (iii) if the TransMissionNo, one of the variables of the communication cycle description, is lower or equal to 3, and the master device has not received the data link layer completing primitive DLLCompleted from the data link layer 80 for the transmission timeout SendTimeOut.

In like manner, after transmitting the notification packet, if the communication cycle the slave device executes is the repeated-notification and the TransMissionNo value is set to be greater than 1, the slave device can get involved in the retransmission of NPDU up to twice. Entry conditions for the retransmission process of the slave device are:

(i) if the TransMissionNo, one of the variables of the communication cycle description, is lower or equal to 3, and the elapsed time ElapsedTime value is greater than the timeout TimeOut value;

(ii) if the TransMissionNo, one of the variables of the communication cycle description, is lower or equal to 3, and the slave device has received the data link layer completing primitive DLLCompleted including the SEND_FAILED from the data link layer 80a; and (iii) if the TransMissionNo, one of the variables of the communication cycle description, is lower or equal to 3, and the slave device has not received the data link layer completing primitive DLLCompleted from the data link layer 80a for the transmission timeout SendTimeOut.

In step S67, upon entering the retransmission processes, the master device and the slave device modify or revise their communication cycle descriptions, and then perform once again the NPDU generation and the communication cycle completion. Here, the communication cycle descriptions are revised as follows:

(i) Increase TransMissionNo by '1';
(ii) Set ElapsedTime to '0'; and
(iii) Set ResRcvState to NOT_RECEIVED.

In step S68, when the communication cycles are completed, whether successfully or not, both the master device and the slave device delete the corresponding communication cycle descriptions. In step S69, the network layers 70 and 70a transfer the network layer completing primitives NLCompleted including a success or a failure reason code value to the application layers 60 and 60a, respectively. If the communication cycle has been successfully completed, the code value is CYCLE_OK, and if not, CYCLE_FAILED.

Aside from the above, at the start point of the data processing, the network layer 70 of the master device can also check and process a duplicate packet among other response packets being received, according to a predetermined method, control each communication cycle using the communication cycle identifier CycleID, and perform an error control function.

Figure 14:
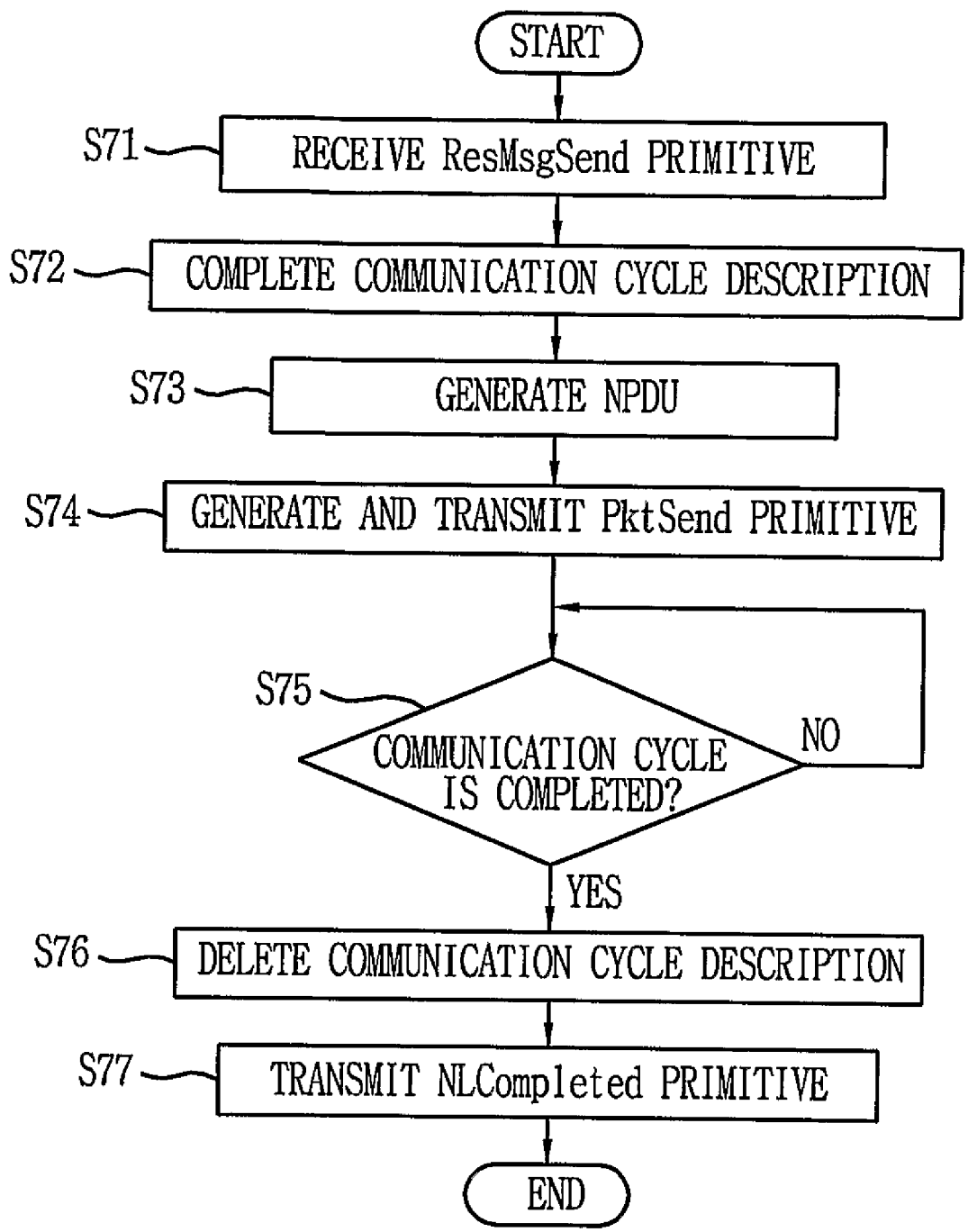
FIG. 14 is a flow chart for describing a data processing method in accordance with a second embodiment of the present invention.

FIG. 14 is a flow chart for describing a data processing method according to a second embodiment of the present invention. To be brief, the second embodiment of the data processing method describes how a response packet of a slave device is processed at the network layer 70a be transmitted from the application layer 60a to the data link layer 80a of the slave device. This method handles the APDU receiving between the network layer 70a and the application layer 60a, and the NPDU transmission between the network layer 70a and the data link layer 80a.

In step S71, the network layer 70a of a slave device receives a response message sending primitive ResMsgSend (i.e., a response message or packet) from the application layer 60a. Also, the network layer 70a estimate an elapsed time ElapsedTime from the point of receiving the primitive.

In step S72, upon receiving the response message sending primitive ResMsgSend from the application layer 60a, the network layer 70a of the slave device records only the communication cycle identifier CycleID value in a pre-generated (or prestored) communication cycle description. Here, the communication cycle description is generated when the network layer 70a receives the request packet receiving primitive ReqPktRcv (to be described) from the data link layer 80.

In step S73, the network layer 70a generates an NPDU using the variables of the corresponding communication cycle description and adding header and trailer of the NPDU to the APDU. Field values of the header are set a's follows.

At first, SA field includes a node address of a sender, PL field (NPDU length) includes a value obtained by the addition of '13' to the APDULength value Included in the primitive from the application layer 60a, and PV field (protocol version) includes a value of 0x20 (version 2.0). Other fields include the values in the communication cycle description. Then, the network layer 70a adds the APDU included in the primitive from the application layer 60a to the header, and the trailer of the NPDU, so that ELP field includes 0x01, and CRC field includes a value of CCITT-16 standard generating polynomial, respectively.

In step S74, after generating an NPDU, the network layer 70a of the slave device transmits a packet sending primitive PktSend including the NPDU to the data link layer 80a, according to the CycleType value set in the cycle communication description. For instance, when the communication cycle type CycleType is the 1-request, multi-response, the network layer 70a of the slave device transmits the NPDU to the data link layer 80a after a delay of response delay time ResDelayTime. As for other types of communication cycle, the network layer 70a of the slave device immediately transmits the NPDU to the data link layer 80a.

When the NPDU transmission is over, the network layer 70a of the slave device-enters the completion of the current communication cycle.

In step S75, the network layer 70a decides the completion of communication cycle control. Once a decision is made on the communication cycle completion, the network layer 70a of the slave device proceeds to step S76 regardless of success or failure in the completion of communication cycle control, and if not, it decides once again.

The network layer 70a of the slave device decides that the communication cycle is successfully completed when the data link layer 80a sends the data link layer completing primitive DLLCompleted including the SEND_OK value after a response packet has been transmitted thereto.

Also, the network layer 70a of the slave device decides that the communication cycle is failed when the data link layer 80a sends the data link layer completing primitive DLLCompleted including the SEND_FAILED value after a response packet has been transmitted thereto, or the network layer 70a has not received the data link layer completing primitive DLLCompleted from the data link layer 80a for the transmission timeout SendTimeOut.

In step S76, when the communication cycle is completed, whether successfully or not, the slave device deletes the corresponding communication cycle description. In step S77, the network layer 70a transfers the network layer completing primitives NLCompleted including a success or a failure reason code value to the application layer 60a. If the communication cycle has been successfully completed, the code value is CYCLE_OK, and if not, CYCLE_FAILED.

Aside from the above, the network layer 70a of the slave device can also check and process a duplicate packet among other request packets being received, according to a predetermined method.

Figure 15:
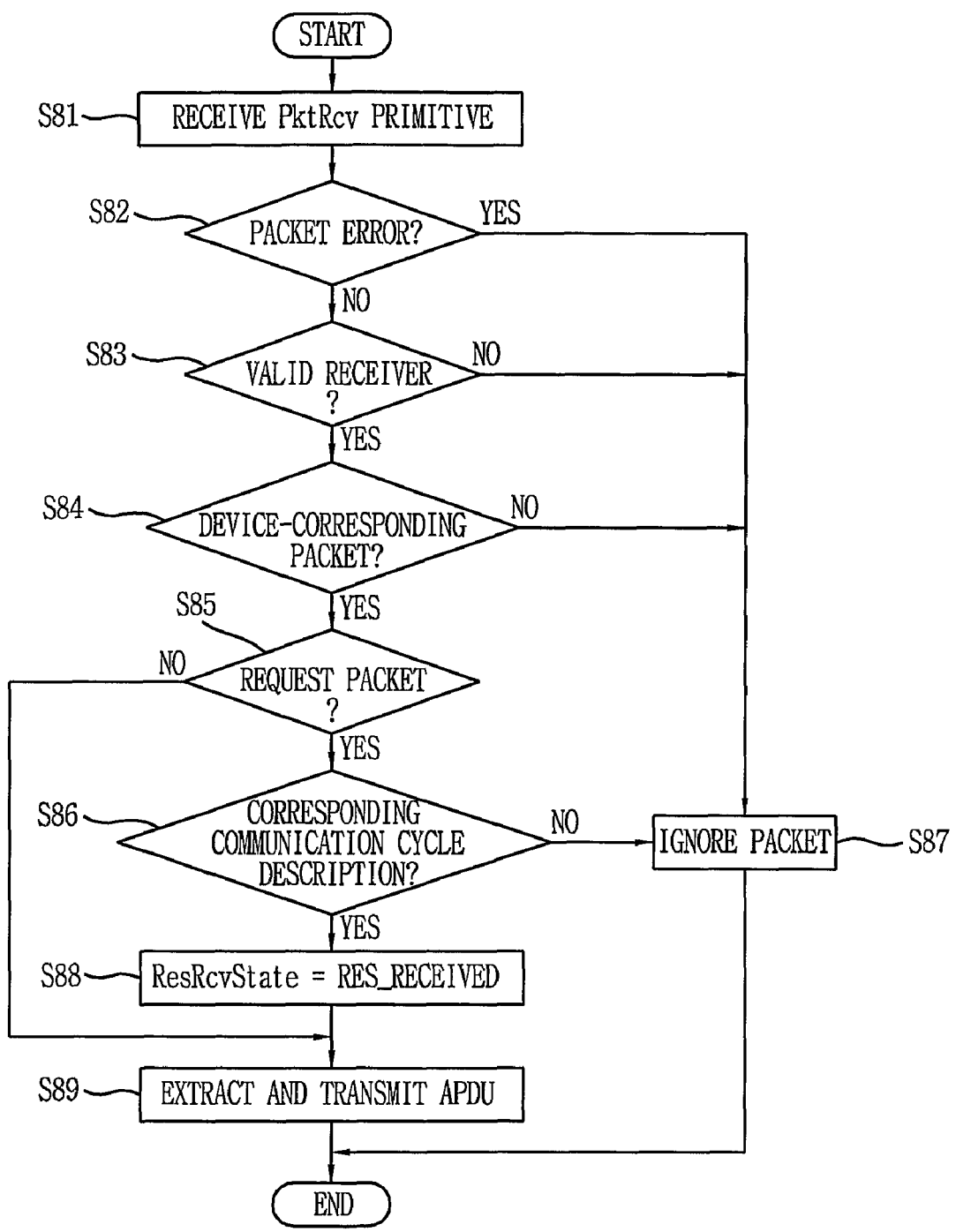
FIG. 15 is a flow chart for describing a data processing method in accordance with a third embodiment of the present invention.

FIG. 15 is a flow chart for describing a data processing method according to a third embodiment of the present invention. To be brief, the third embodiment of the data processing method describes how the network layer 70 of a master device processes the packet receiving primitive PktRcv from the data link layer 80, and transmits the PktRcv to the application layer 60.

In step S81, the network layer 70 of a master device receives the packet receiving primitive PktRcv (i.e., NPDU) from the data link layer 80.

In step S82, upon receiving the NPDU from the data link layer 80, the network layer of the master device checks a value of the SLP field, the first field of the packet, and a value of the ELP field, the last field of the packet. More specifically, in step S82, the network layer 70 of the master devices checks whether the SLP field value and the ELP field value include predetermined values (for example, 0x02, 0x03), respectively. When the two field values include the predetermined values, respectively, the network layer 70 processes the packet, and if not, in other words, if at least one of the field value does not include the predetermined value, the network layer 70 proceeds to step S87 and ignores the received packet.

After processing the values of the SLP field and the ELP field of the NPDU, the network layer 70 calculates a value of the CRC field. If there is an error, the network layer 70 proceeds to step S87 and ignores the received packet.

Even though the value of the CRC field is normal, if a value of the PL field is different from the NPDU size, the network layer 70 proceeds to step S87 and ignores the received packet.

In step S83, the network layer 70 checks an address of the master device and a sender address of the received packet, to find out the master device is a valid receiver. In other words, when the network layer 70 receives the NPDU, it checks whether the DA field value in the packet header is recognizable, by using its product code, logical address, and cluster code. If the master device having received the packet is not a valid receiver, the network layer 70 proceeds to step 87 and ignores the packet.

For instance, suppose that a device has a product code of 0bXXX XXXX, a logical address of 0bYYY YYYY, and a cluster code of 0bZZZ ZZZZ. Then, the network layer 70 should be able to recognize 8 kinds of addresses.

Address designation for all devices: 0b1111 1111 1111 1111 or 0b0111 1111 1111 1111 (0xFFFF or 0x7FFF);
Address designation by product code: 0b1XXX XXXX 1111 1111 or 0b0XXX XXXX 1111 1111;
Address designation by cluster code: 0b1111 1111 ZZZZ ZZZZ;
Address designation by logical address: 0b0111 1111 YYYY YYYY;
Address designation by product code and logical address: 0b0XXX XXXX YYYY YYYY; and
Address designation by product code and cluster code: 0b0XXX XXXX ZZZZ ZZZZ.

Also, in case that a plurality of LnCP devices are Implemented to a single product (in a physical sense), the network layer should be able to recognize 8 kinds of addresses for each device.

Furthermore, regardless of their own node addresses, the network managers 20 to 23 should be able to recognize 0X00FF address indicating all network managers. And, in case of receiving a notification packet, the network managers 20 to 23 should be able to recognize an initial address of the network managers 20 to 23 or 0x0000 address designated as the node address of the home gateway 10.

In addition, the network layer 70 ignores the received NPDU if the value of the SA field in the NPDU header from the data link layer 80 is one of the following:

(i) in case of a group address, the produce code is 0x7F or the logical address if 0xFF; and
(ii) if the address option bit is 1.

In step S84, each device decides whether the received packet corresponds to its own characteristics. That is, when the NPDU from the data link layer 80 is neither a response packet nor a notification packet, the network layer 70 of the master device proceeds to step S87, and ignores the packet.

In step S85, the network layer 70 of the master device decides whether the received NPDU is a request packet. If so, the network layer 70 proceeds to step S86. If the received NPDU is a request packet, however, the network layer 70 proceeds to step S89.

In step S86, the network layer 70 of the master device compares the received response packet to a pre-stored communication cycle description.

If the network layer 70 received a desired packet after having transmitted a request packet, it proceeds to step S88, where the response receiving state ResRcvState is set to RES_ RECEIVED. If there is no communication cycle description corresponding to the response packet (please refer to step S86), the network layer 70 regards the received packet as a duplicate packet, so it ignores the packet in step S87.

In detail, the network layer 70 of the master device can set the decision criteria or rules through the following examples to decide whether the received packet corresponds to a pre-stored communication cycle description.

Figure 16:
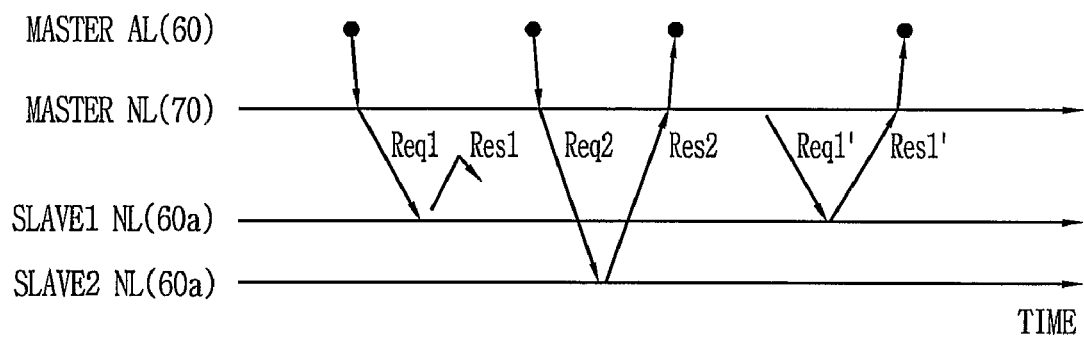
FIGS. 16 and 17 respectively illustrate cases in which a master device communicates with a plurality of slave devices, and a network layer processes a consecutive communication cycle.
Figure 17:
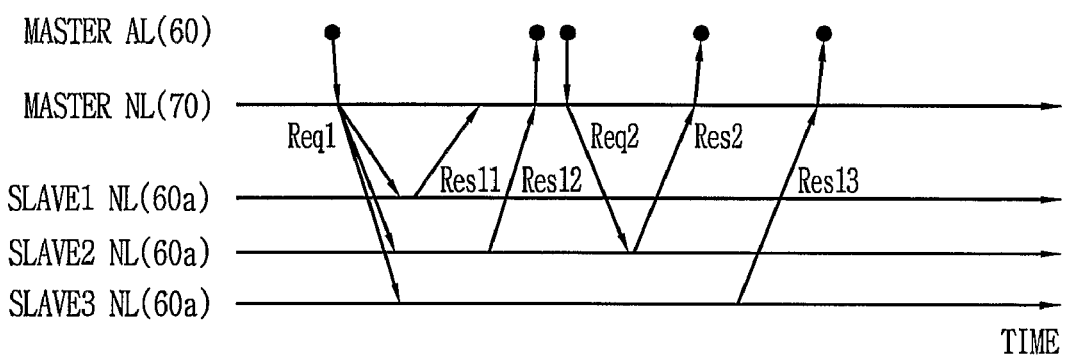

FIGS. 16 and 17 respectively illustrate cases, in which a master device communicates with a plurality of slave devices, and the network layer 70 of the master device processes a consecutive communication cycle.

FIG. 16 illustrates a plurality of communication cycles between one master device and a plurality of slave devices. Referring to the drawing, the network layer 70 of the master device transmitted request packets Res1 and Res2 sequentially. Due to an error in a response packet 1 Res1, however, the network layer 70 received a response packet 2 Res2 first and then the response packet 1 Res1. In this case, the network layer 70 can make the request packets 1 and 2 correspond to the response packets 1 and 2, respectively, by utilizing the connector address ConnectorAddr stored in the communication cycle description for each request packet and the SA field value of the response packet.

FIG. 17 illustrates a plurality of communication cycles via a combination (or integration) of multicast and unicast between one master device and a plurality of slave devices. Referring to the drawing, after a request packet 1 Req1 was multicasted, a request packet 2 Req2 was unicasted. On the other hand, response packets were received in order of Res11, Res12, Res2 and Res13. Since a plurality of response packets are sent from the same slave device, the network layer 70 of the master device compares the connector address ConnectorAddr and the packet number PacketNo included in the communication cycle description of each request packet to the values of the SA field and the PN field in the response packet, respectively, so that the request packets and the response packets can be correspondent with each other.

Provided that the communication cycle type is the 1-request, 1-response, the network layer 70 decides that the response packet and the pre-stored communication cycle description are correspondent with each other if:

(i) the sender address of a request packet having been transmitted corresponds to the address of a sender of a response packet received; and
(ii) the value of PN field in the request packet having been transmitted equals to the value of PN field in the response packet received.

Similarly, provided that the communication cycle type is the 1-request, multi-response, the network layer 70 decides that the response packet and the pre-stored communication cycle description are correspondent with each other if:

(i) the sender address of a request packet having been transmitted is a group address that includes the address of a sender of a response packet received; and
(ii) the value of PN field in the request packet having been transmitted equals to the value of PN field in the response packet received.

Referring back to FIG. 15, in step S89, the network layer 70 of the master device extracts an APDU and transmits the request message receiving primitive ReqMsgRcv including the APDU to the application layer 60. The APDU is extracted from the NPDU using a value of the NHL field. Although it is possible that the header of the received NPDU might include a certain field that is not defined in this specification, the network layer 70 must extract the APDU anyway by recognizing the number of bytes designated for the NHL field as the header.

Figure 18:
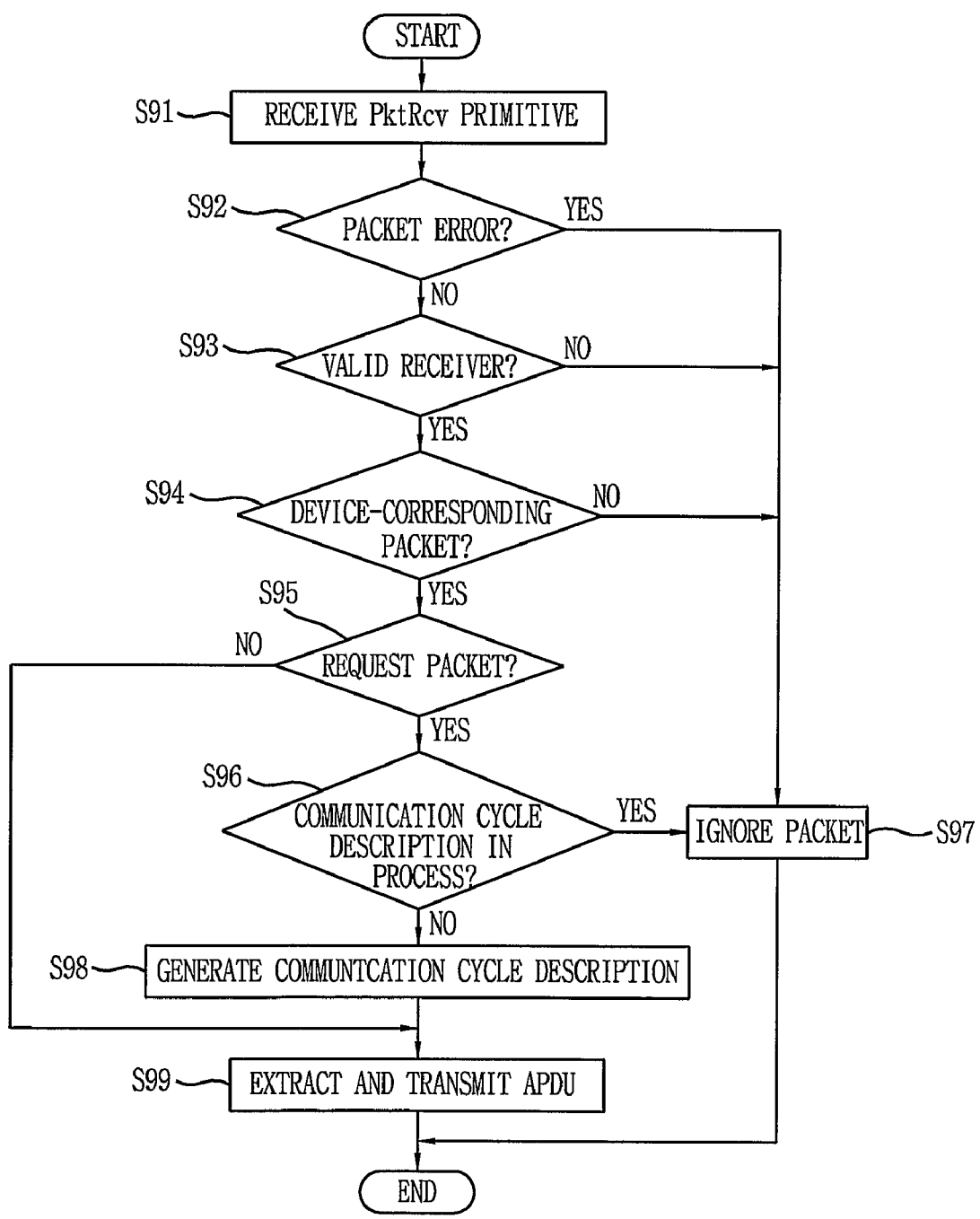
FIG. 18 is a flow chart for describing a data processing method in accordance with a fourth embodiment of the present invention.

FIG. 18 is a flow chart for describing a data processing method according to a fourth embodiment of the present invention. To be brief, the fourth embodiment of the data processing method describes how the network layer 70a of a slave device processes the packet receiving primitive PktRcv from the data link layer 80a and transmits the primitive to the application layer 60a.

Here, steps S91 to S93, S95, S97 and S99 are identical with the steps S81 to S83, S85, S87 and S89 in FIG. 15, respectively.

In step S94, if the NPDU from the data link layer 80a is neither a request packet nor a notification packet, the network layer 70a of the slave device proceeds to step S97 and ignores the packet.

In step S96, if a request packet is transmitted from the data link layer 80a, the network layer 70a of the slave device checks whether there exists a communication cycle description currently being processed. If there is, the network layer 70a proceeds to step S97 and ignores the received request packet. But if there is no such communication cycle description, the network layer 70a proceeds to step S98.

In step S98, the network layer 70a of the slave device generates a communication cycle description required for the aforementioned NPDU.

As for the generation of a communication cycle description in pursuant to a request packet being received, one should set the variables of the description as follows.

At first the communication cycle identifier CycleID is not set here (this is set in step S72 of FIG. 14). The communication cycle type CycleType is set to the 1-request, 1-response if the value of the SA field included in the request packet designates a single receiver, or the 1-request, multi-response if the value of the SA field designates a group address. The connector address ConnectorAddr is set to the value of the SA field included in the request packet, and the packet number PacketNo is set to the value of the PN field included in the request packet. The network layer service NLService is set to '0' (Acknowledged service), the transmission priority SvcPriority is set to the value of the SP field included in the request packet, and the timeout TimeOut is the TimeOut included in the received packet. The transmission number TransmissionNo is set to '1'. The elapsed time ElapsedTime is set to '0'. Lastly, the response receiving state ResRcvState indicates whether a notification packet is received, given that a notification packet has been transmitted. Thus, it is set to NOT_RECEIVED.

Referring again to FIG. 18, in step S99, after generating the communication cycle description, the network layer 70a of the slave device undergoes a predetermined checking process for a duplicate packet to extract an APDU, and transfers the APDU to the application layer 60a. If the slave device received a notification packet, it is not necessary to generate a communication cycle description. In such case, the network layer 70a of the slave device simply checks a duplicate packet following the predetermined process to extract an APDU, and transmits the APDU to the application layer 60a.

The following will now describe in greater detail how the slave device performs the duplicate packet checking process on the received packet (i.e., the NPDU).

Figure 19:
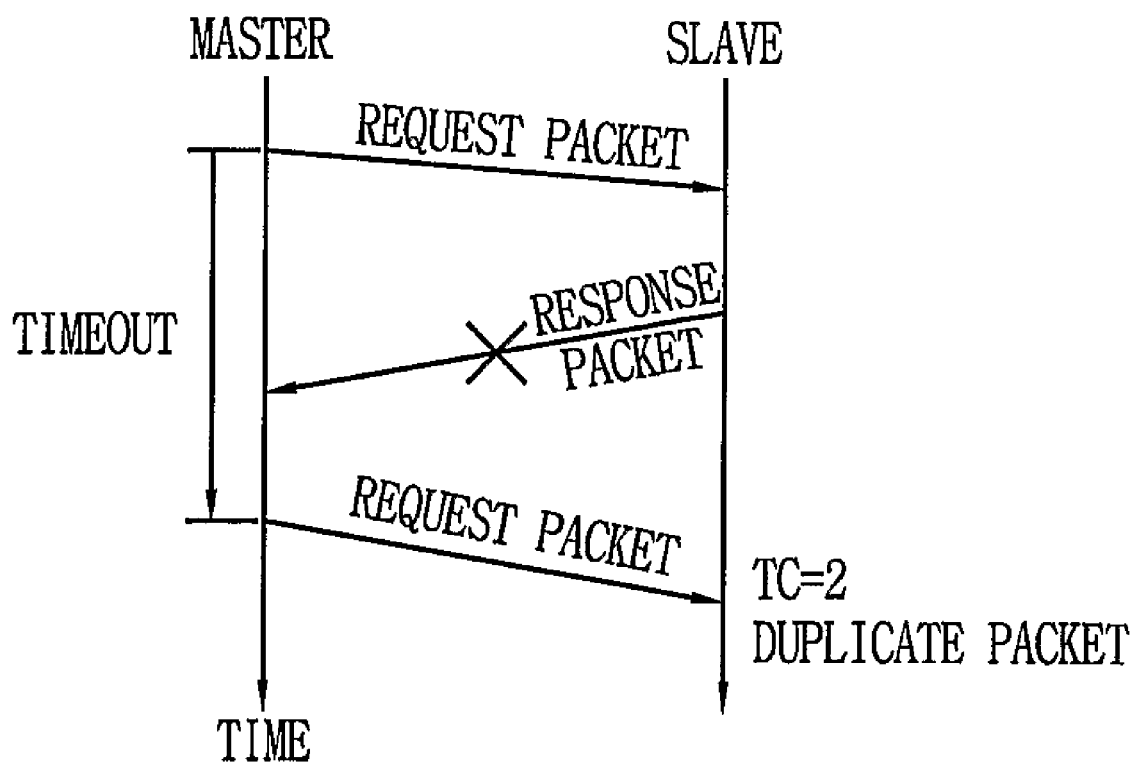
FIG. 19 diagrammatically illustrates a first embodiment of an occurrence of a duplicate packet.

FIG. 19 depicts a first embodiment of an occurrence of a duplicate packet

In particular, FIG. 19 illustrates a situation where a master device transmitted a request packet, and a slave device received and processed the request packet normally. Unfortunately however, a response packet the slave device sent to the master device is lost during transmission. Since the response packet from the slave device was not transmitted for the timeout TimeOut, the master device increases the value of the TC field in the request packet by 1, and retransmits the request packet to the slave device. In this case, the slave device decides whether or not the request packet this time is retransmitted, on the basis of the value of the TC field (which indicates the transmission counter) in the NPDU header.

Figure 20:
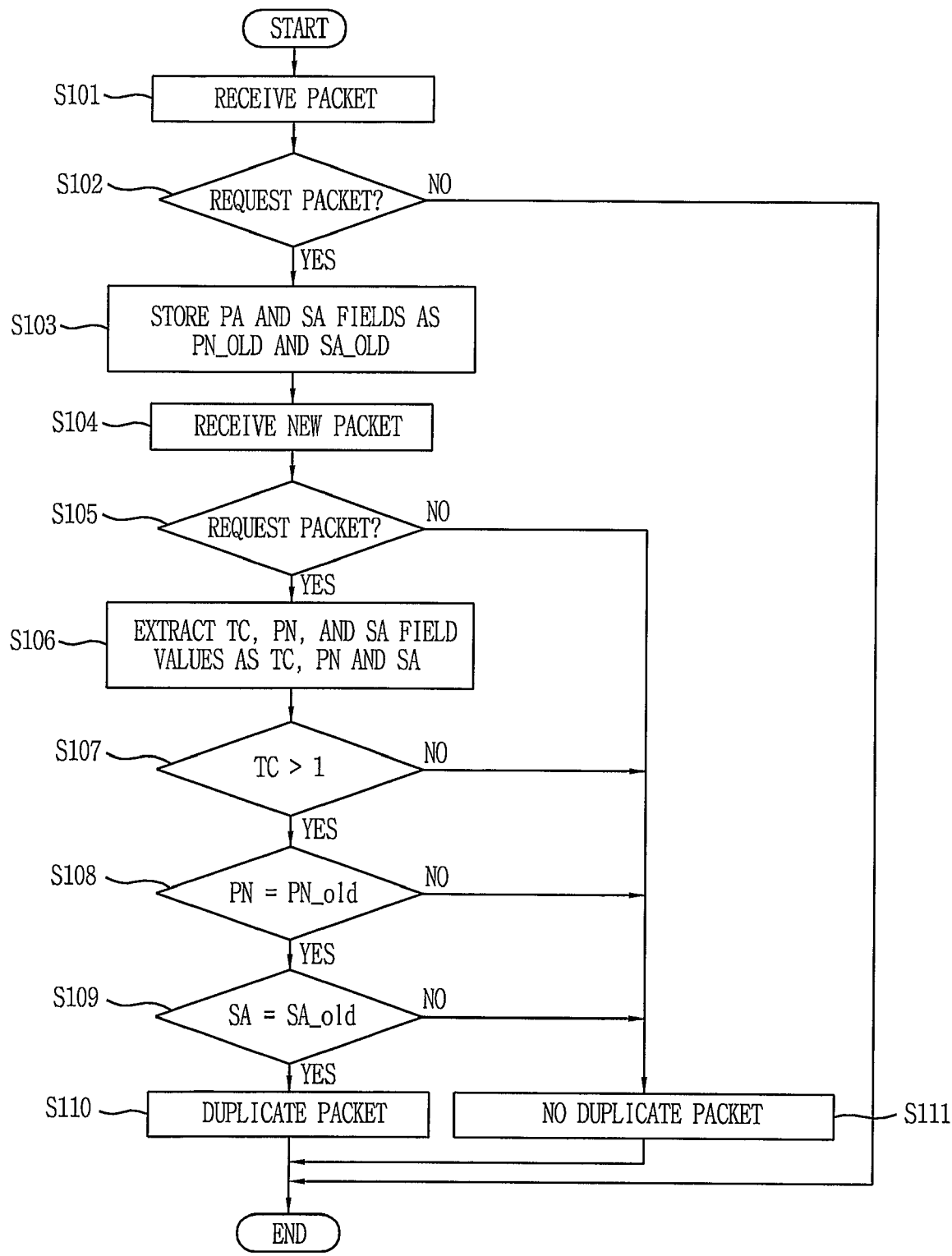
FIG. 20 is a flow chart for describing a duplicate packet checking method in accordance with a first embodiment of the present invention.

FIG. 20 is a flow chart for describing a duplicate packet checking method in accordance with a first embodiment of the present invention.

In detail, in step S101, a slave device receives a packet from a master device. In step S102, if it turns out that the received packet is a request packet, the slave device proceeds to step S103, and if not, the checking process is ended.

In step S103, the slave device stores values of the PN field and the SA field in the received packet as PN_old and SA_old, respectively.

In step S104, the slave device receives a new packet from the master device, and in step S105, the slave device checks whether the new packet is a request packet. If yes, the slave device proceeds to step S106, and if not, it proceeds to step S111, in which the slave device decides that the new packet is not a duplicate packet and ends the checking process.

In step S106, the slave device extracts values of the TC field, the PN field and the SA field in the new packet as TC, PN, and SA, respectively.

In steps S107 to S109, based on the TC of the new packet, the slave device compares the PN_old and the SA_old of the stored packet to the PN and the SA of the new packet. When the comparison conditions are met, the slave device decides that the new packet is a duplicate packet (S110), and if not, the slave device decides that the new packet is not a duplicate packet (S111) and ends the checking process. Also, in step S107, the slave devices checks whether the TC value is greater than '1'. And, in step S109, the slave device checks whether the sender addresses of the old and new request packets are identical. This step is necessary because during the timeout TimeOut, that is, when the master device that originally transmitted the request packet is waiting for a response packet from the slave device, other master devices can make communication attempts to the same slave device.

When the duplicate packet elapsed time DupElapsedTime, one of the parameters of the network layer, has lapsed since the slave device received the most recent request packet, the PN_old and the SA_old are initialized.

Figure 21:
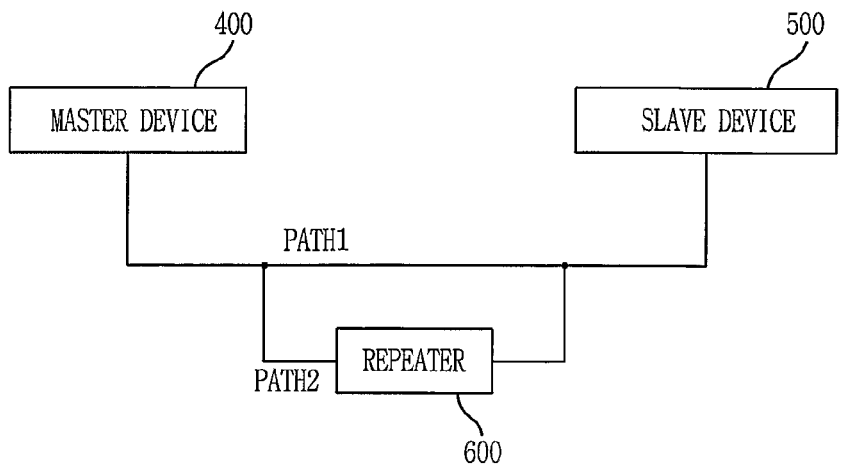
FIGS. 21 and 22 respectively illustrate a second embodiment of an occurrence of a duplicate packet.
Figure 22:
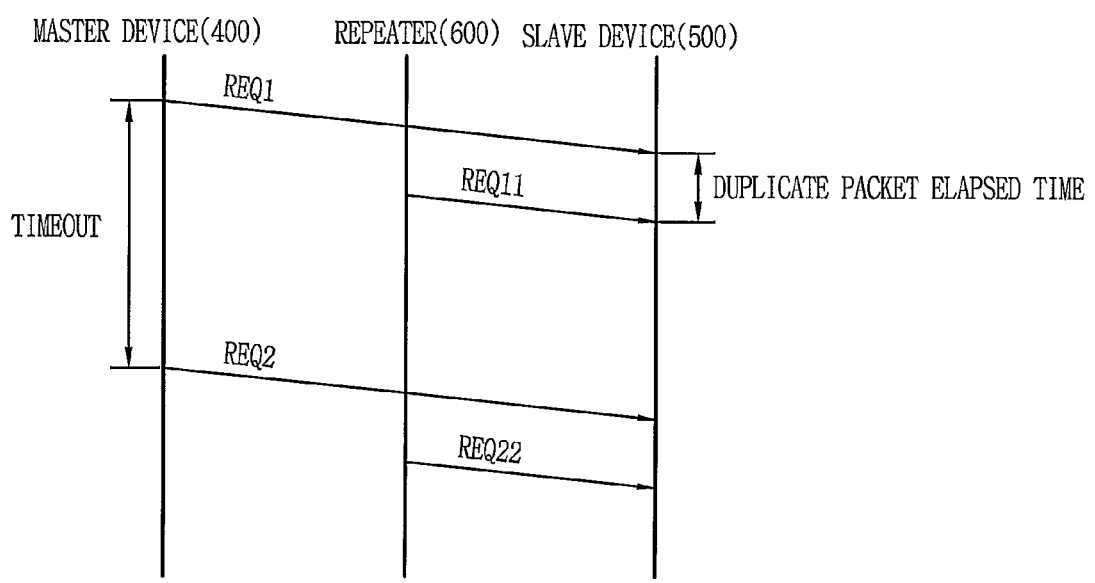

FIGS. 21 and 22 respectively illustrate a second embodiment of an occurrence of a duplicate packet.

Referring to FIG. 21, a master device 400 and a slave device 500 are connected through different transmission paths, path1 and path2. Primarily, the path2 is provided to repeat and amplify a weak signal traveling on the path1 between the master device 400 and the slave device 500. Therefore, a repeater 600 for repeating and amplifying the signals is provided onto the path2.

Referring to FIG. 22, when the master device 400 transmits a request packet 1 Req1 to the slave device 500, the Req1 travels along the path1. Also, a Req11 having passed through the repeater 600 is transmitted to the slave device 500 via the path2 after a delay of the duplicate packet elapsed time. Since the same packet is being transferred via different paths, the duplicate packet elapsed time between duplicate packets being received is not greater than the maximum repeater delay time RepeatedDelayTime. Here, the maximum repeater delay time RepeatedDelayTime includes the packet processing time of the repeater 600 on the packet transmission path, and the transmission time at an actual transmission medium.

Whenever the master device 400 transmits an individual packet, it increases the value of PN by 1. If the master device 400 already processed the same individual communication cycle three times, it cannot transmit the same packet to the same slave device 500 for the fourth time during the maximum repeater delay time RepeaterDelayTime.

Figure 23:
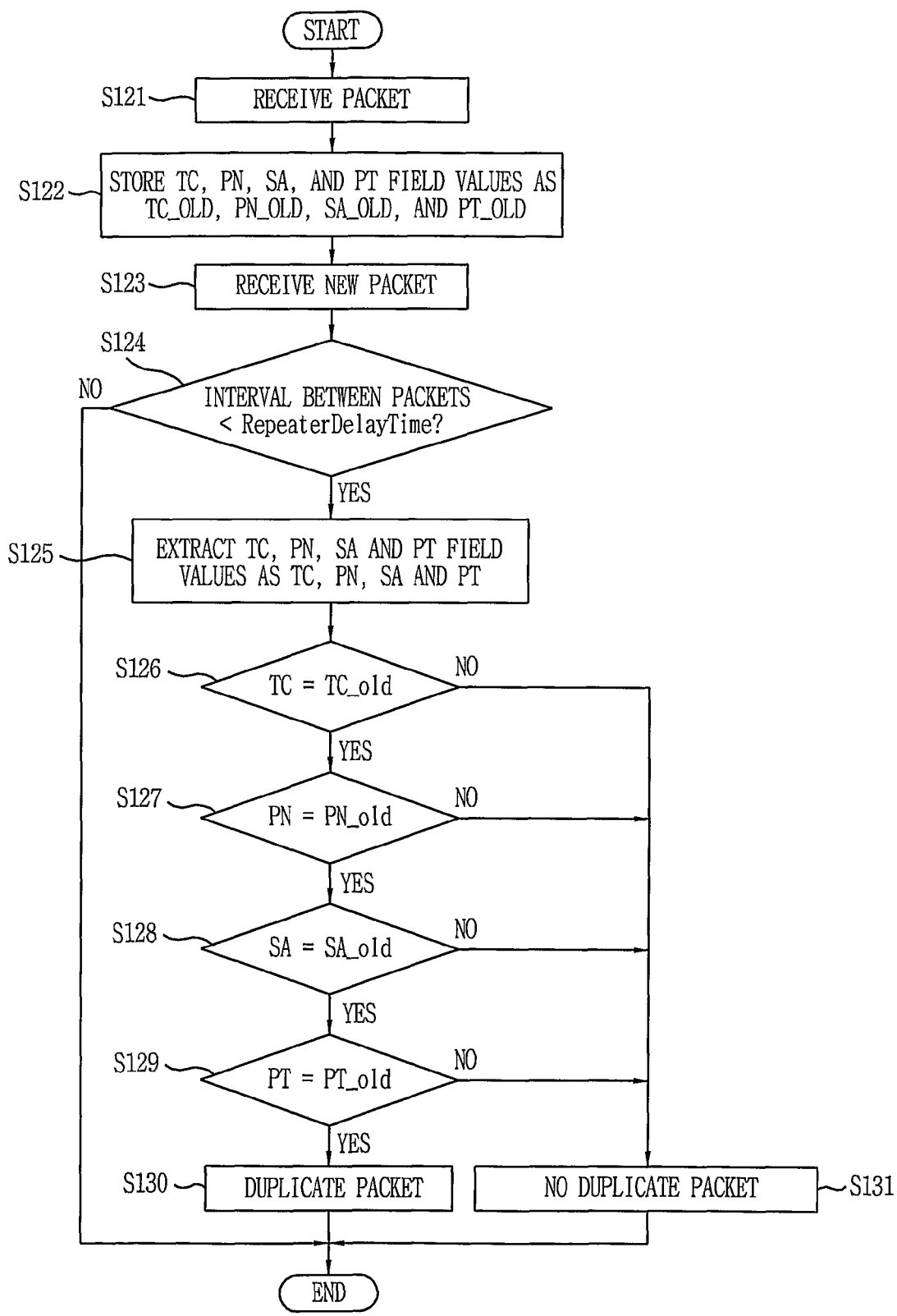
FIG. 23 is a flow chart for describing a duplicate packet checking method in accordance with a second embodiment of the present invention.

FIG. 23 is a flow chart for describing a duplicate packet checking method in accordance with a second embodiment of the present invention.

In step S121, a slave device 500 receives a packet from a master device 400, and in step S122, the slave device 500 stores values of the TC field, the PN field, the SA field and the PT field in the received packet as TC_old, PN_old, SA_old and PT_old, respectively.

In step 123, the slave device 500 receives a new packet from the master device 400. In step S124, if the interval between the previously received packet and the new packet is less than the maximum repeater delay time RepeaterDelayTime, the slave device proceeds to step S125, and if not, the duplicate checking process is ended.

In step S125, the slave device 500 extracts values of the TC field, the PN field and the SA field in the new packet as TC, PN, and SA, respectively.

In steps S126 to S129, the slave device 500 compares the TC_old, PN_old, SA_old and PT_old values the stored packet to the TC, PN, SA and PT values of the new packet. When every comparison condition is met, the slave device 500 decides that the new packet is a duplicate packet (S130), and if not, the slave device decides that the new packet is not a duplicate packet (S131) and ends the checking process. This method is applicable to both the request packet and the notification packet.

When the received packet is a duplicate packet, the slave device 500, or the network layer 70a of the slave device 500 to more accurate, transfers the request message receiving primitive ReqMsgRcv including a value DUPLICATED_PKT(1) to the application layer 60a.

As discussed earlier, the present invention provides the data processing method for network layer based on a control protocol which is a general communication standard for providing functions of controlling and monitoring electric devices in the home network system.

Also, the present invention provides the data processing method at the network layer using a living network control protocol as a general communication standard.

Also, the data processing method of the present invention increases data transmission efficiency by retransmitting data in specific cases.

Also, the present invention enables the packet transmission from the application layer to the data link layer.

Also, the present invention enables the transmission of the response packet or the notification packet from the data link layer to the application layer in the master device.

Similarly, the present invention also enables the transmission of the response packet or the notification packet from the data link layer to the application layer in the slave device.

Also, the present invention can be advantageously used for checking the duplicate packet by searching the communication cycle description corresponding to the received packet.

Also, by checking and processing the duplicate packet, the present invention increased data processing efficiency.

Also, the present invention is capable of checking and processing the duplicate packet in the network with a plurality of different transmission paths.

Also, the present invention enables the transmission of the response packet from the application layer to the data link layer of the slave device.

Also, the present invention fulfills the transmission of the response packet by completing the communication cycle description corresponding to the previously received request packet.

Although the preferred embodiments of the present invention have been described, it is understood that the present invention should not be limited to these preferred embodiments but various changes and modifications can be made by one skilled in the art within the spirit and scope of the present invention as hereinafter claimed.

What is claimed is:

1. A method of processing data for an electric device comprising a controller, the controller processing data according to a predetermined protocol and controlling at least one of a physical layer, a data link layer, a network layer and an application layer, the method being performed at the network layer and comprising:

receiving, via the controller, a message sending primitive being included in an application layer protocol data unit from the application layer;

generating, via the controller, a communication cycle description according to the message sending primitive, wherein the communication cycle description includes information for controlling a current communication cycle for processing the message sending primitive, and comprises a communication cycle type which includes one of a request-response type and a notification type;

generating, via the controller, a packet sending primitive being included in a network layer protocol data unit according to the message sending primitive and the communication cycle description; and transmitting, via the controller, the packet sending primitive to the data link layer.

2. The method of claim 1, further comprising:

completing, via the controller, the current communication cycle based on the communication cycle description.

3. The method of claim 1, further comprising:

checking, via the controller, whether or not a data link layer completing primitive is received from the data link layer, the data link layer completing primitive comprising a first code value, wherein the first code value indicates a result of the communication cycle of the data link layer.

4. The method of claim 3, wherein completing the current communication cycle comprises:

if the data link layer completing primitive is received from the data link layer, transmitting, via the controller, a network layer completing primitive comprising a second code value, to the application layer, wherein the second code value indicates a result of the communication cycle of the network layer.

5. The method of claim 3, further comprising:

storing, via the controller, the generated network layer protocol data unit.

6. The method of claim 5, further comprising:

if the data link layer completing primitive is not received from the data link layer, retransmitting, via the controller, the packet sending primitive being included in the stored network layer protocol data unit to the data link layer.

7. The method of claim 2, wherein generating the packet sending primitive comprises:
adding, via the controller, a header and a trailer of the network layer protocol data unit to the application layer protocol data unit; and
generating, via the controller, the network layer protocol data unit.

8. The method of claim 1,
wherein the electric device is applied to a master device, and
wherein the message sending primitive is a request message sending primitive.

9. The method of claim 1,
wherein the electric device is a slave device, and
wherein the message sending primitive is an event message sending primitive.

10. The method of claim 1, wherein the communication cycle description further comprises at least one of a communication cycle identifier, a connector address, a packet number, a network layer service, a service priority, a timeout, a transmission number for transmitting the same network layer protocol data unit, an elapsed time from receiving the communication cycle identifier from the application layer, and a response receiving state indicating whether a response packet is received in response to the message sending primitive.

11. An electric device for processing data, according to a predetermined protocol through at least one of a physical layer, a network layer and an application layer, comprising:
a controller for processing data,
the controller being configured to:
receive, via the network layer, a message sending primitive from the application layer, the message sending primitive being included in an application layer protocol data unit,
generate, via the network layer, a communication cycle description according to the message sending primitive,
wherein the communication cycle description includes information for controlling a current communication cycle for processing the message sending primitive, and comprises a communication cycle type which includes one of a request-response type and a notification type,
generate, via the network layer, a packet sending primitive according to the message sending primitive and the communication cycle description, the packet sending primitive being included in a network layer protocol data unit,
transmitting, via the network layer, the packet sending primitive to the data link layer, and
completing, via the network layer, the current communication cycle based on the communication cycle description.

* * * * *